(12) United States Patent
Daniel

(10) Patent No.: US 9,692,585 B2
(45) Date of Patent: Jun. 27, 2017

(54) EQUALIZING DISTRIBUTED ANTENNA SYSTEM EQUIPPED WITH MULTIPLE BASE STATION INTERFACE PORTS

(71) Applicant: Corning Optical Communications Wireless Ltd, Airport (IL)

(72) Inventor: Liav Moshe Daniel, Gedera (IL)

(73) Assignee: Corning Optical Communications Wireless Ltd, Airport (IL)

( * ) Notice: Subject to any disclaimer, the term of this patent is extended or adjusted under 35 U.S.C. 154(b) by 0 days.

(21) Appl. No.: 15/157,766

(22) Filed: May 18, 2016

(65) Prior Publication Data

US 2016/0352497 A1 Dec. 1, 2016

Related U.S. Application Data

(60) Provisional application No. 62/169,255, filed on Jun. 1, 2015.

(51) Int. Cl.
*H04L 5/16* (2006.01)
*H04L 25/03* (2006.01)
*H04W 24/08* (2009.01)
*H04W 88/08* (2009.01)

(52) U.S. Cl.
CPC .......... *H04L 5/16* (2013.01); *H04L 25/03159* (2013.01); *H04W 24/08* (2013.01); *H04W 88/085* (2013.01)

(58) Field of Classification Search
CPC .......... H04L 5/16; H04L 25/03; H04W 24/08; H04W 88/08

USPC .......................................................... 398/16
See application file for complete search history.

(56) References Cited

U.S. PATENT DOCUMENTS

| | | |
|---|---|---|
| 5,790,606 A | 8/1998 | Dent |
| 6,466,767 B1 | 10/2002 | Lidbrink et al. |
| 8,750,363 B2 | 6/2014 | Nentwig |
| 9,281,975 B1 | 3/2016 | Saig |
| 2002/0163961 A1 | 11/2002 | Birru |
| 2007/0264009 A1* | 11/2007 | Sabat, Jr. ........... H04B 10/1127 398/5 |
| 2009/0180426 A1* | 7/2009 | Sabat ................. H04W 88/085 370/328 |

(Continued)

FOREIGN PATENT DOCUMENTS

WO 2015112592 A1 7/2015

*Primary Examiner* — Dalzid Singh
(74) *Attorney, Agent, or Firm* — C. Keith Montgomery

(57) ABSTRACT

Optimizing ripple reductions in equalizers shared between multiple interface ports in a distributed antenna system (DAS). In one aspect, a downlink equalizer is shared between a downlink simplex port and a duplex port in a radio interface module(s) (RIM(s)) in the DAS. In another aspect, to optimize ripple reduction in the downlink equalizer, the downlink equalizer is configured to go through a plurality of downlink equalizer states that each can generate a downlink equalizer frequency response affecting downlink ripple of the RIM(s). At each of the downlink equalizer states, a test signal is provided to the downlink equalizer and a corresponding downlink ripple of the RIM(s) is recorded. When all of the downlink equalizer states are evaluated based on the test signal, the downlink equalizer is configured to function based on the downlink equalizer state associated with the smallest downlink ripple of the RIM(s).

25 Claims, 13 Drawing Sheets

(56) References Cited

U.S. PATENT DOCUMENTS

| | | | |
|---|---|---|---|
| 2011/0002371 A1* | 1/2011 | Forenza | H04B 7/0417 375/227 |
| 2014/0050482 A1* | 2/2014 | Berlin | H04B 7/155 398/115 |
| 2015/0003565 A1* | 1/2015 | George | H04B 7/0413 375/299 |

* cited by examiner

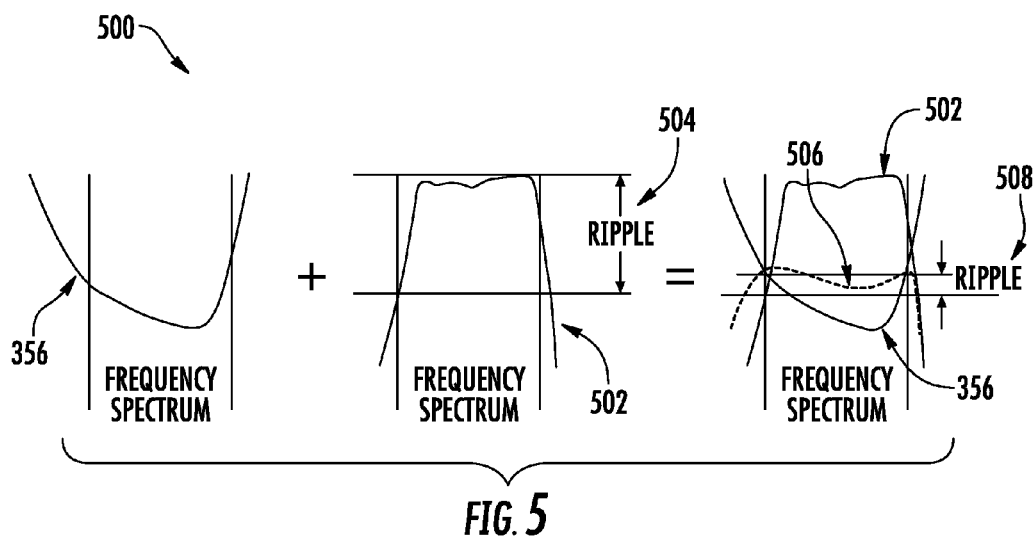

EQUALIZING DISTRIBUTED ANTENNA SYSTEM EQUIPPED WITH MULTIPLE BASE STATION INTERFACE PORTS

This application claims the benefit of priority under 35 U.S.C. §119 of U.S. Provisional Application Ser. No. 62/169,255 filed on Jun. 1, 2015 the content of which is relied upon and incorporated herein by reference in its entirety.

BACKGROUND

The disclosure relates generally to distributed antenna systems (DAS) and more particularly to techniques for minimizing downlink and uplink ripples within the DAS.

Wireless customers are increasingly demanding digital data services, such as streaming video signals. At the same time, some wireless customers use their wireless communication devices in areas that are poorly serviced by conventional cellular networks, such as inside certain buildings or areas where there is little cellular coverage. One response to the intersection of these two concerns has been the use of DASs. DASs include remote antenna units (RAUs) configured to receive and transmit communications signals to client devices within the antenna range of the RAUs. DASs can be particularly useful when deployed inside buildings or other indoor environments where the wireless communication devices may not otherwise be able to effectively receive radio frequency (RF) signals from a source.

In this regard, FIG. 1 illustrates distribution of communications services to remote coverage areas 100(1)-100(N) of a DAS 102, wherein 'N' is the number of remote coverage areas. These communications services can include cellular services, wireless services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on RAUs 104(1)-104(N) connected to a head-end equipment (HEE) 106 (e.g., a head-end controller, a head-end unit, or a central unit). The HEE 106 may be communicatively coupled to a signal source 108, for example, a base transceiver station (BTS) or a baseband unit (BBU). In this regard, the HEE 106 receives downlink communications signals 110D from the signal source 108 to be distributed to the RAUs 104(1)-104(N). The RAUs 104(1)-104(N) are configured to receive the downlink communications signals 110D from the HEE 106 over a communications medium 112 to be distributed to the respective remote coverage areas 100(1)-100(N) of the RAUs 104(1)-104(N). In a non-limiting example, the communications medium 112 may be a wired communications medium, a wireless communications medium, or an optical fiber-based communications medium. Each of the RAUs 104(1)-104(N) may include an RF transmitter/receiver (not shown) and a respective antenna 114(1)-114(N) operably connected to the RF transmitter/receiver to wirelessly distribute the communications services to client devices 116 within the respective remote coverage areas 100(1)-100(N). The RAUs 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by amount of RF power transmitted by the respective RAUs 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the RAUs 104(1)-104(N) mainly determine the size of the respective remote coverage areas 100(1)-100(N).

With reference to FIG. 1, the DAS 102 may be configured to support a wide range of frequency bands. For example, the downlink communications signals 110D are communicated in a downlink frequency band that ranges from one thousand nine hundred thirty megahertz (1930 MHz) to one thousand nine hundred ninety-five megahertz (1995 MHz). The uplink communications signals 110U are communicated in an uplink frequency band that ranges from one thousand eight hundred fifty megahertz (1850 MHz) to one thousand nine hundred fifteen megahertz (1915 MHz). To minimize out-of-band emissions, downlink and uplink bandpass filters (e.g., Chebyshev filter) (not shown) are commonly employed in the HEE 106 to pass the downlink communications signals 110D and the uplink communications signals 110U in the 1930-1995 MHz downlink frequency band and the 1850-1915 MHz uplink frequency band, respectively. Due to the inherent non-linearity, the downlink and uplink bandpass filters can generate periodic insertion losses with frequency (also known as ripples) in the downlink communications signals 110D and the uplink communications signals 110U. Since excessive ripples can distort the downlink communications signals 110D and the uplink communications signals 110U, it may be desirable to minimize the ripples without increasing the orders of the bandpass filters.

No admission is made that any reference cited herein constitutes prior art. Applicant expressly reserves the right to challenge the accuracy and pertinency of any cited documents.

SUMMARY

Embodiments of the disclosure relate to optimizing ripple reductions in equalizers shared between multiple interface ports in a distributed antenna system (DAS). In one aspect, a downlink equalizer is shared between a downlink simplex port and a duplex port in a radio interface module(s) (RIM(s)) in the DAS. In another aspect, to optimize ripple reduction in the downlink equalizer, the downlink equalizer is configured to go through a plurality of downlink equalizer states that each can generate a downlink equalizer frequency response affecting downlink ripple of the RIM(s). At each of the downlink equalizer states, a test signal is provided to the downlink equalizer and a corresponding downlink ripple of the RIM(s) is recorded. When all of the downlink equalizer states are evaluated based on the test signal, the downlink equalizer can be configured to function based on the downlink equalizer state associated with the smallest downlink ripple of the RIM(s). By optimizing ripple reduction in the downlink equalizer shared between multiple of the downlink simplex ports and the duplex ports, it is possible to reduce the number of downlink equalizers in the RIM(s) to save cost and reduce complexity while still providing frequency response flatness in the DAS.

One embodiment of the disclosure relates to a system for optimizing ripple reductions in a DAS. The system comprises at least one RIM. The RIM comprises at least one downlink port configured to receive a downlink communications signal in a downlink frequency spectrum from a signal source. The RIM also comprises a downlink interface configured to provide the downlink communications signal to a downlink path. The RIM also comprises a downlink equalizer configured to minimize downlink ripple in the at least one RIM based on a predetermined downlink equalizer setting. The system also comprises a control system. The control system is configured to command the downlink equalizer to go through a plurality of downlink equalizer states based on a plurality of downlink digital words, respectively. The control system is also configured to, for each downlink equalizer state of the plurality of downlink equalizer states, provide a downlink test signal to the at least one downlink port. The downlink test signal comprises one or more predefined downlink frequency steps across the downlink frequency spectrum of the downlink communications signal. The control system is also configured to, for each downlink equalizer state of the plurality of downlink equalizer states, measure and record a respective downlink ripple in association with each downlink equalizer state of the plurality of downlink equalizer states based on the downlink test signal. The control system is also configured to examine a plurality of recorded downlink ripples corresponding to the plurality of downlink equalizer states, respectively. The control system is also configured to define the predetermined downlink equalizer setting as a downlink equalizer state among the plurality of downlink equalizer states associated with a smallest recorded downlink ripple among the plurality of recorded downlink ripples.

Another embodiment of the disclosure relates to a method for optimizing ripple reductions in a DAS. The method comprises communicatively coupling a control system to at least one RIM configured to communicate a downlink communications signal in a downlink frequency spectrum. The method also comprises commanding a downlink equalizer in the at least one RIM to go through a plurality of downlink equalizer states based on a plurality of downlink digital words, respectively. The method also comprises, for each downlink equalizer state of the plurality of downlink equalizer states, providing a downlink test signal comprising one or more predefined downlink frequency steps across the downlink frequency spectrum of the downlink communications signal. The method also comprises, for each downlink equalizer state of the plurality of downlink equalizer states, measuring and recording a respective downlink ripple of the at least one RIM in association with each downlink equalizer state of the plurality of downlink equalizer states based on the downlink test signal. The method also comprises examining a plurality of recorded downlink ripples corresponding to the plurality of downlink equalizer states, respectively. The method also comprises defining a predetermined downlink equalizer setting as a downlink equalizer state among the plurality of downlink equalizer states associated with a smallest recorded downlink ripple among the plurality of recorded downlink ripples. The method also comprises configuring the downlink equalizer to minimize the downlink ripple of the at least one RIM based on the predetermined downlink equalizer setting.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 4D is a table providing exemplary illustration of a plurality of downlink digital words or a plurality of uplink digital words for controlling the equalizers in FIGS. 4A-4C;

FIG. 5 is a graph providing an exemplary illustration of a downlink equalizer frequency response generated by the downlink equalizer of FIG. 3A that can change downlink ripple in the RIM of FIG. 3A;

DETAILED DESCRIPTION

Embodiments of the disclosure relate to optimizing ripple reductions in equalizers shared between multiple interface ports in a distributed antenna system (DAS). In one aspect, a downlink equalizer is shared between a downlink simplex port and a duplex port in a radio interface module(s) (RIM(s)) in the DAS. In another aspect, to optimize ripple reduction in the downlink equalizer, the downlink equalizer is configured to go through a plurality of downlink equalizer states that each can generate a downlink equalizer frequency response affecting downlink ripple of the RIM(s). At each of the downlink equalizer states, a test signal is provided to the downlink equalizer and a corresponding downlink ripple of the RIM(s) is recorded. When all of the downlink equalizer states are evaluated based on the test signal, the downlink equalizer can be configured to function based on the downlink equalizer state associated with the smallest downlink ripple of the RIM(s). By optimizing ripple reduction in the downlink equalizer shared between multiple of the downlink simplex ports and the duplex ports, it is possible to reduce the number of downlink equalizers in the RIM(s) to save cost and reduce complexity while still providing frequency response flatness in the DAS.

Before discussing examples of optimizing ripple reductions in downlink and uplink equalizers shared between multiple downlink and uplink interface ports, respectively, starting at FIG. 3A, an overview of an exemplary DAS including RIMs that have multiple downlink and uplink interface ports is first discussed with reference to FIG. 2. The discussion of specific exemplary aspects of optimizing ripple reductions in downlink and uplink equalizers starts with reference to FIG. 3A.

Figure 1:
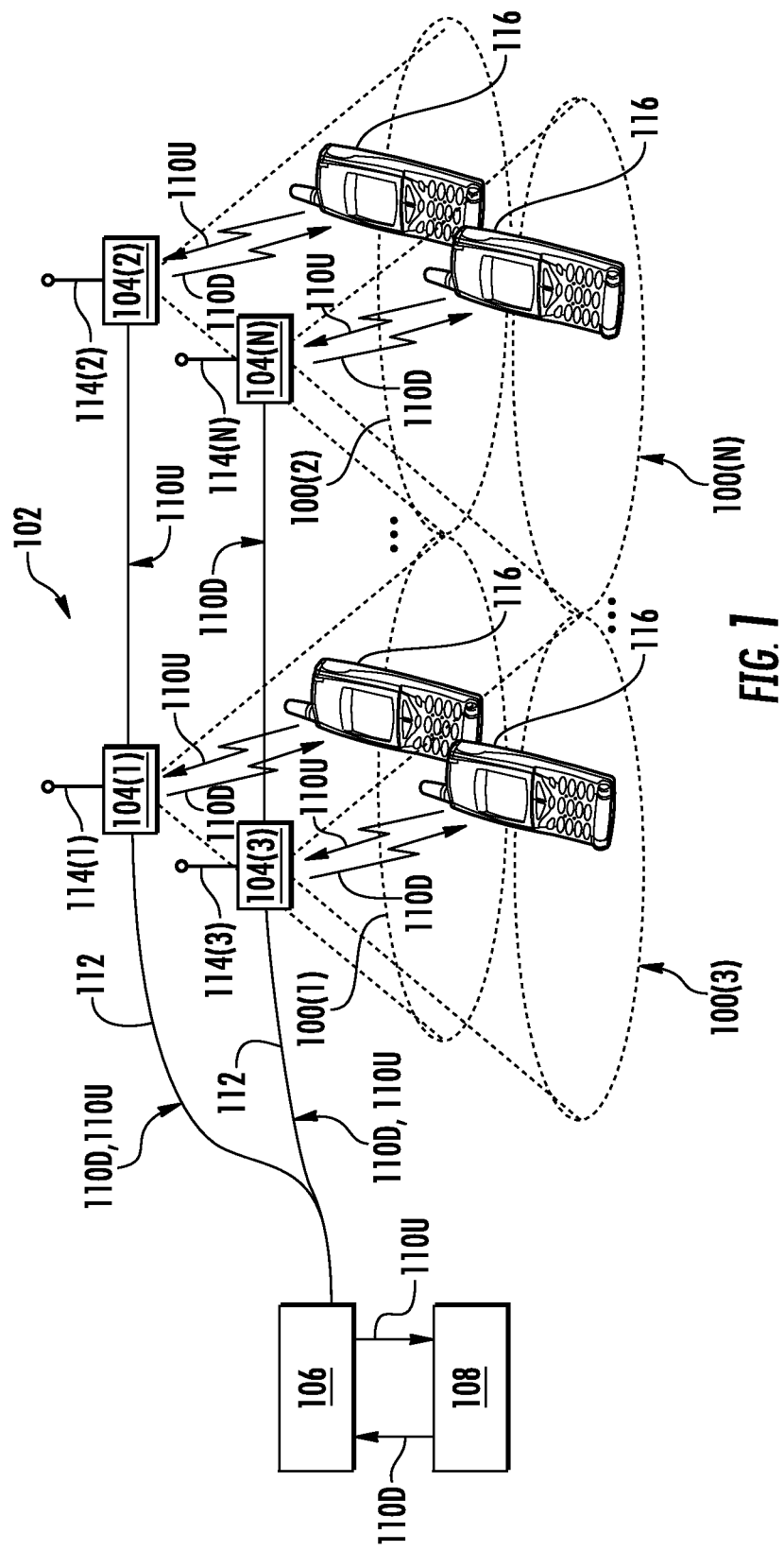
FIG. 1 illustrates distribution of communications services to remote coverage areas of a distributed antenna system (DAS)
Figure 2:
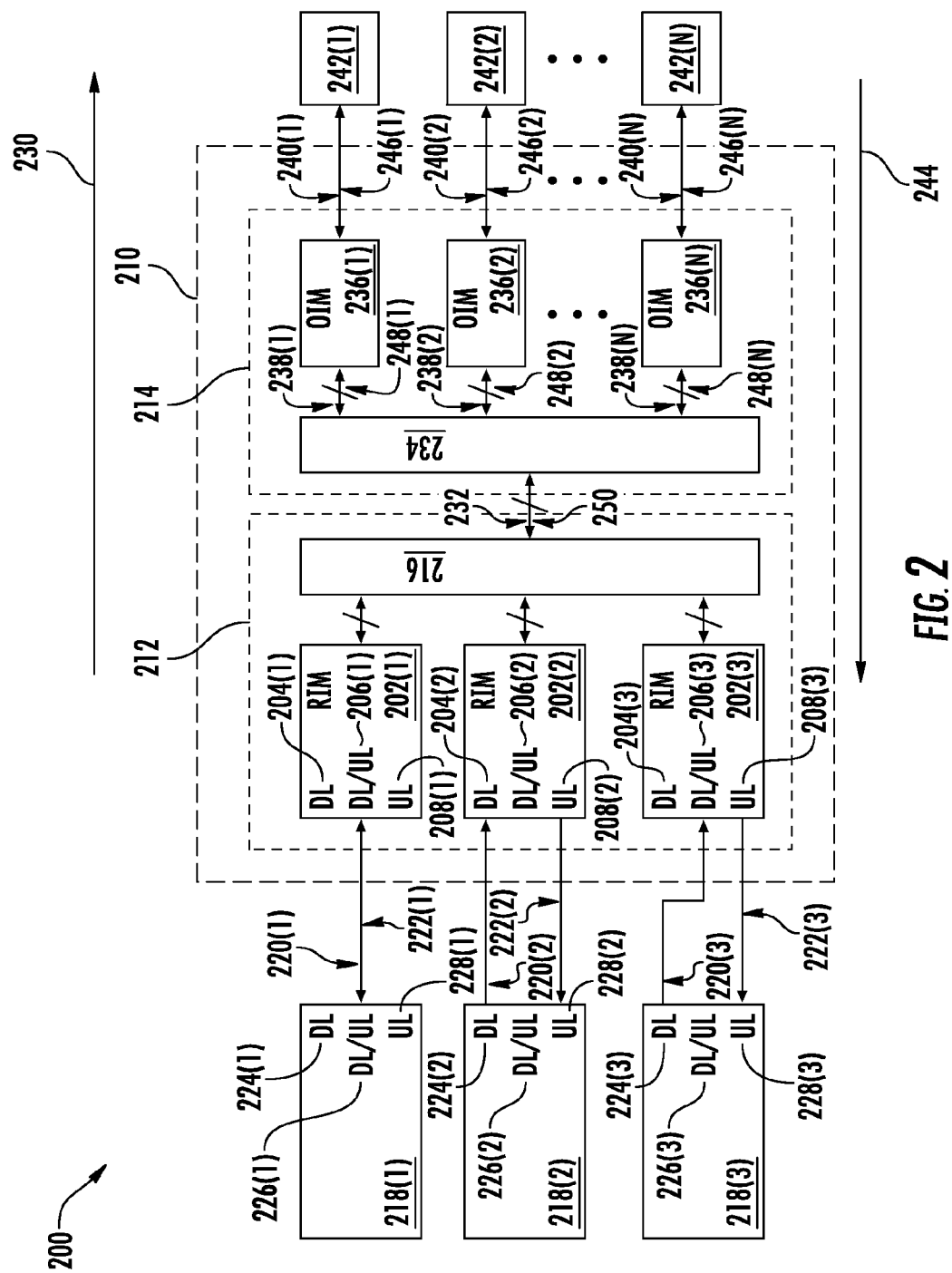
FIG. 2 is a schematic diagram of an exemplary DAS including at least one first radio interface module (RIM), at least one second RIM, and at least one third RIM each having multiple interface ports.

In this regard, FIG. 2 is a schematic diagram of an exemplary DAS 200 including at least one first RIM 202(1), at least one second RIM 202(2), and at least one third RIM 202(3) each having multiple interface ports. Although the DAS 200 as shown in FIG. 2 includes only the first RIM 202(1), the second RIM 202(2), and the third RIM 202(3), it shall be appreciated that the DAS 200 can include more than three (3) RIMs.

The first RIM 202(1) includes a first downlink simplex port 204(1), a first duplex port 206(1), and a first uplink simplex port 208(1). Collectively, the first downlink simplex port 204(1), the first duplex port 206(1), and the first uplink simplex port 208(1) are referred to as multiple interface ports in the first RIM 202(1). The second RIM 202(2) includes a second downlink simplex port 204(2), a second duplex port 206(2), and a second uplink simplex port 208(2). Collectively, the second downlink simplex port 204(2), the second duplex port 206(2), and the second uplink simplex port 208(2) are referred to as multiple interface ports in the second RIM 202(2). The third RIM 202(3) includes a third downlink simplex port 204(3), a third duplex port 206(3), and a third uplink simplex port 208(3). Collectively, the third downlink simplex port 204(3), the third duplex port 206(3), and the third uplink simplex port 208(3) are referred to as multiple interface ports in the third RIM 202(3).

With continuing reference to FIG. 2, the DAS 200 includes a head end unit (HEU) 210. The HEU 210 includes a radio interface unit (RIU) 212 and an optical interface unit (OIU) 214. The RIU 212 includes the first RIM 202(1), the second RIM 202(2), the third RIM 202(3), and a combiner/splitter 216.

The first RIM 202(1) is communicatively coupled to a first signal source 218(1) to receive a first downlink communications signal 220(1) from the first signal source 218(1) and to provide a first uplink communications signal 222(1) to the first signal source 218(1). In a non-limiting example, the first signal source 218(1) may be a radio source such as a base transceiver station (BTS) or a digital signal source such as a baseband unit (BBU). The first signal source 218(1) includes a first signal source downlink simplex port 224(1), a first signal source duplex port 226(1), and a first signal source uplink simplex port 228(1). In a non-limiting example, the first signal source 218(1) is configured to provide the first downlink communications signal 220(1) and receive the first uplink communications signal 222(1) via the first signal source duplex port 226(1). Accordingly, the first RIM 202(1) is also configured to receive the first downlink communications signal 220(1) and provide the first uplink communications signal 222(1) via the first duplex port 206(1).

The second RIM 202(2) is communicatively coupled to a second signal source 218(2) to receive a second downlink communications signal 220(2) from the second signal source 218(2) and to provide a second uplink communications signal 222(2) to the second signal source 218(2). In a non-limiting example, the second signal source 218(2) may be a radio source such as a BTS or a digital signal source such as a BBU. The second signal source 218(2) includes a second signal source downlink simplex port 224(2), a second signal source duplex port 226(2), and a second signal source uplink simplex port 228(2). In a non-limiting example, the second signal source 218(2) is configured to provide the second downlink communications signal 220(2) via the second signal source downlink simplex port 224(2) and receive the second uplink communications signal 222(2) via the second signal source uplink simplex port 228(2). Accordingly, the second RIM 202(2) is also configured to receive the second downlink communications signal 220(2) via the second downlink simplex port 204(2) and provide the second uplink communications signal 222(2) via the second uplink simplex port 208(2).

The third RIM 202(3) is communicatively coupled to a third signal source 218(3) to receive a third downlink communications signal 220(3) from the third signal source 218(3) and to provide a third uplink communications signal 222(3) to the third signal source 218(3). In a non-limiting example, the third signal source 218(3) may be a radio source such as a BTS or a digital signal source such as a BBU. The third signal source 218(3) includes a third signal source downlink simplex port 224(3), a third signal source duplex port 226(3), and a third signal source uplink simplex port 228(3). In a non-limiting example, the third signal source 218(3) is configured to provide the third downlink communications signal 220(3) via the third signal source downlink simplex port 224(3) and receive the third uplink communications signal 222(3) via the third signal source uplink simplex port 228(3). Accordingly, the third RIM 202(3) can be configured to receive the third downlink communications signal 220(3) via the third duplex port 206(3) and provide the third uplink communications signal 222(3) via the third uplink simplex port 208(3).

With continuing reference to FIG. 2, in a downlink path 230, the first RIM 202(1) provides the first downlink communications signal 220(1) to the combiner/splitter 216. The second RIM 202(2) provides the second downlink communications signal 220(2) to the combiner/splitter 216. The third RIM 202(3) provides the third downlink communications signal 220(3) to the combiner/splitter 216. The combiner/splitter 216 combines the first downlink communications signal 220(1), the second downlink communications signal 220(2), and the third downlink communications signal 220(3) to generate a combined downlink communications signal 232 and communicates the combined downlink communications signal 232 to the OIU 214.

The OIU 214 includes a splitter/combiner 234 and a plurality of optical interface modules (OIMs) 236(1)-236(N). The splitter/combiner 234 splits the combined downlink communications signal 232 into a plurality of electrical downlink communications signals 238(1)-238(N) and provides the plurality of electrical downlink communications signals 238(1)-238(N) to the plurality of OIMs 236(1)-236(N), respectively. The plurality of OIMs 236(1)-236(N)

converts the plurality of electrical downlink communications signals 238(1)-238(N) into a plurality of optical downlink communications signals 240(1)-240(N), respectively. The plurality of OIMs 236(1)-236(N) then provides the plurality of optical downlink communications signals 240(1)-240(N) to a plurality of remote antenna units (RAUs) 242(1)-242(N), respectively.

With continuing reference to FIG. 2, in an uplink path 244, the plurality of OIMs 236(1)-236(N) receives a plurality of optical uplink communications signals 246(1)-246(N) from the plurality of RAUs 242(1)-242(N), respectively. The plurality of OIMs 236(1)-236(N) converts the plurality of optical uplink communications signals 246(1)-246(N) into a plurality of electrical uplink communications signals 248(1)-248(N), respectively. The splitter/combiner 234 combines the plurality of electrical uplink communications signals 248(1)-248(N) into a combined uplink communications signal 250. The splitter/combiner 234 then provides the combined uplink communications signal 250 to the combiner/splitter 216. The combiner/splitter 216 splits the combined uplink communications signal into the first uplink communications signal 222(1), the second uplink communications signals 222(2), and the third uplink communications signal 222(3). The first RIM 202(1) receives the first uplink communications signal 222(1) from the combiner/splitter 216 and provides the first uplink communications signal 222(1) to the first signal source 218(1). The second RIM 202(2) receives the second uplink communications signal 222(2) from the combiner/splitter 216 and provides the second uplink communications signal 222(2) to the second signal source 218(2). The third RIM 202(3) receives the third uplink communications signal 222(3) from the combiner/splitter 216 and provides the third uplink communications signal 222(3) to the third signal source 218(3).

In a non-limiting example, the first signal source 218(1) is configured to receive the first uplink communications signal 222(1) via the first signal source duplex port 226(1). Accordingly, the first RIM 202(1) is configured to provide the first uplink communications signal 222(1) to the first signal source 218(1) via the first duplex port 206(1).

In another non-limiting example, the second signal source 218(2) is configured to receive the second uplink communications signal 222(2) via the second signal source uplink simplex port 228(2). Accordingly, the second RIM 202(2) is configured to provide the second uplink communications signal 222(2) to the second signal source 218(2) via the second uplink simplex port 208(2).

In another non-limiting example, the third signal source 218(3) is configured to receive the third uplink communications signal 222(3) via the third signal source uplink simplex port 228(3). Accordingly, the third RIM 202(3) is configured to provide the third uplink communications signal 222(3) to the third signal source 218(3) via the third uplink simplex port 208(3).

With continuing reference to FIG. 2, the first downlink communications signal 220(1), the second downlink communications signal 220(2), and the third downlink communications signal 220(3) are configured to operate in respective downlink frequency spectrums (e.g., operation bands). As such, it is necessary to employ downlink bandpass filters (not shown) in the first RIM 202(1), the second RIM 202(2), and the third RIM 202(3) to pass the first downlink communications signal 220(1), the second downlink communications signal 220(2), and the third downlink communications signal 220(3) only in the respective downlink frequency spectrums. Likewise, the first uplink communications signal 222(1), the second uplink communications signal 222(2), and the third uplink communications signal 222(3) are configured to operate in respective uplink frequency spectrums (e.g., operation bands). As such, it is necessary to employ uplink bandpass filters (not shown) in the first RIM 202(1), the second RIM 202(2), and the third RIM 202(3) to pass the first uplink communications signal 222(1), the second uplink communications signal 222(2), and the third uplink communications signal 222(3) only in the respective uplink frequency spectrums.

Due to inherent non-linearity of the downlink bandpass filters, ripples may be generated in the first downlink communications signal 220(1), the second downlink communications signal 220(2), and the third downlink communications signal 220(3). As a result, it is necessary to equalize the first downlink communications signal 220(1), the second downlink communications signal 220(2), and the third downlink communications signal 220(3) to reduce ripples. In a non-limiting example, the terminology such as "equalize," "equalization," and other similar terms generally refers to adjusting signal strength (or gain) to a desired level. Other similar terminology may include "calibrate," "adjust" and the like. Generally, and by way of more specific examples, "equalization" refers to adjustment of frequency response of the first downlink communications signal 220(1), the second downlink communications signal 220(2), and the third downlink communications signal 220(3). In contrast, terms such as "calibration" refers to equalizing the first downlink communications signal 220(1), the second downlink communications signal 220(2), and the third downlink communications signal 220(3) to a standard for a desired parameter. Generally, the equalization process provides for ripple reductions in the respective frequency spectrums of the first downlink communications signal 220(1), the second downlink communications signal 220(2), and the third downlink communications signal 220(3).

Similarly, due to inherent non-linearity of the uplink bandpass filters, ripples may also be generated in the first uplink communications signal 222(1), the second uplink communications signal 222(2), and the third uplink communications signal 222(3). As a result, it is also necessary to equalize the first uplink communications signal 222(1), the second uplink communications signal 222(2), and the third uplink communications signal 222(3) to reduce ripples.

With continuing reference to FIG. 2, according to previous discussions, the first RIM 202(1) may be configured to receive the first downlink communications signal 220(1) via either the first downlink simplex port 204(1) or the first duplex port 206(1). Likewise, the second RIM 202(2) may be configured to receive the second downlink communications signal 220(2) via either the second downlink simplex port 204(2) or the second duplex port 206(2). The third RIM 202(3) may be configured to receive the third downlink communications signal 220(3) via either the third downlink simplex port 204(3) or the third duplex port 206(3). Similarly, the first RIM 202(1) may be configured to provide the first uplink communications signal 222(1) via either the first duplex port 206(1) or the first uplink simplex port 208(1). Likewise, the second RIM 202(2) may be configured to provide the second uplink communications signal 222(2) via either the second duplex port 206(2) or the second uplink simplex port 208(2). The third RIM 202(3) may be configured to provide the third uplink communications signal 222(3) via either the third duplex port 206(3) or the third uplink simplex port 208(3).

As such, a straight forward approach for reducing ripples in the first downlink communications signal 220(1) is to provide two separate downlink equalizers (not shown) in the first RIM 202(1) to equalize the first downlink communications signal 220(1) received via the first downlink simplex port 204(1) and the first duplex port 206(1), respectively. Likewise, two separate downlink equalizers can be provided in the second RIM 202(2) to equalize the second downlink communications signal 220(2) received via the second downlink simplex port 204(2) and the second duplex port 206(2), respectively. Also, two separate downlink equalizers can be provided in the third RIM 202(3) to equalize the third downlink communications signal 220(3) received via the third downlink simplex port 204(3) and the third duplex port 206(3), respectively.

Similarly, two separate uplink equalizers (not shown) can be provided in the first RIM 202(1) to equalize the first uplink communications signal 222(1) to be provided via the first duplex port 206(1) and the first uplink simplex port 208(1), respectively. Likewise, two separate uplink equalizers can be provided in the second RIM 202(2) to equalize the second uplink communications signal 222(2) to be provided via the second duplex port 206(2) and the second uplink simplex port 208(2), respectively. Also, two separate uplink equalizers can be provided in the third RIM 202(3) to equalize the third uplink communications signal 222(3) to be provided via the third duplex port 206(3) and the third uplink simplex port 208(3), respectively.

In this regard, two separate downlink equalizers and two separate uplink equalizers are needed in each of the first RIM 202(1), the second RIM 202(2), and the third RIM 202(3). As a result, cost, footprint, and/or power consumption of the first RIM 202(1), the second RIM 202(2), and the third RIM 202(3) may be increased. Hence, it may be desired to employ a single downlink equalizer in the first RIM 202(1), the second RIM 202(2), and the third RIM 202(3) to reduce ripples in the first downlink communications signal 220(1), the second downlink communications signal 220(2), and the third downlink communications signal 220(3), respectively. Likewise, it may also be desired to employ a single uplink equalizer in the first RIM 202(1), the second RIM 202(2), and the third RIM 202(3) to reduce ripples in the first uplink communications signal 222(1), the second uplink communications signal 222(2), and the third uplink communications signal 222(3).

Figure 3A:
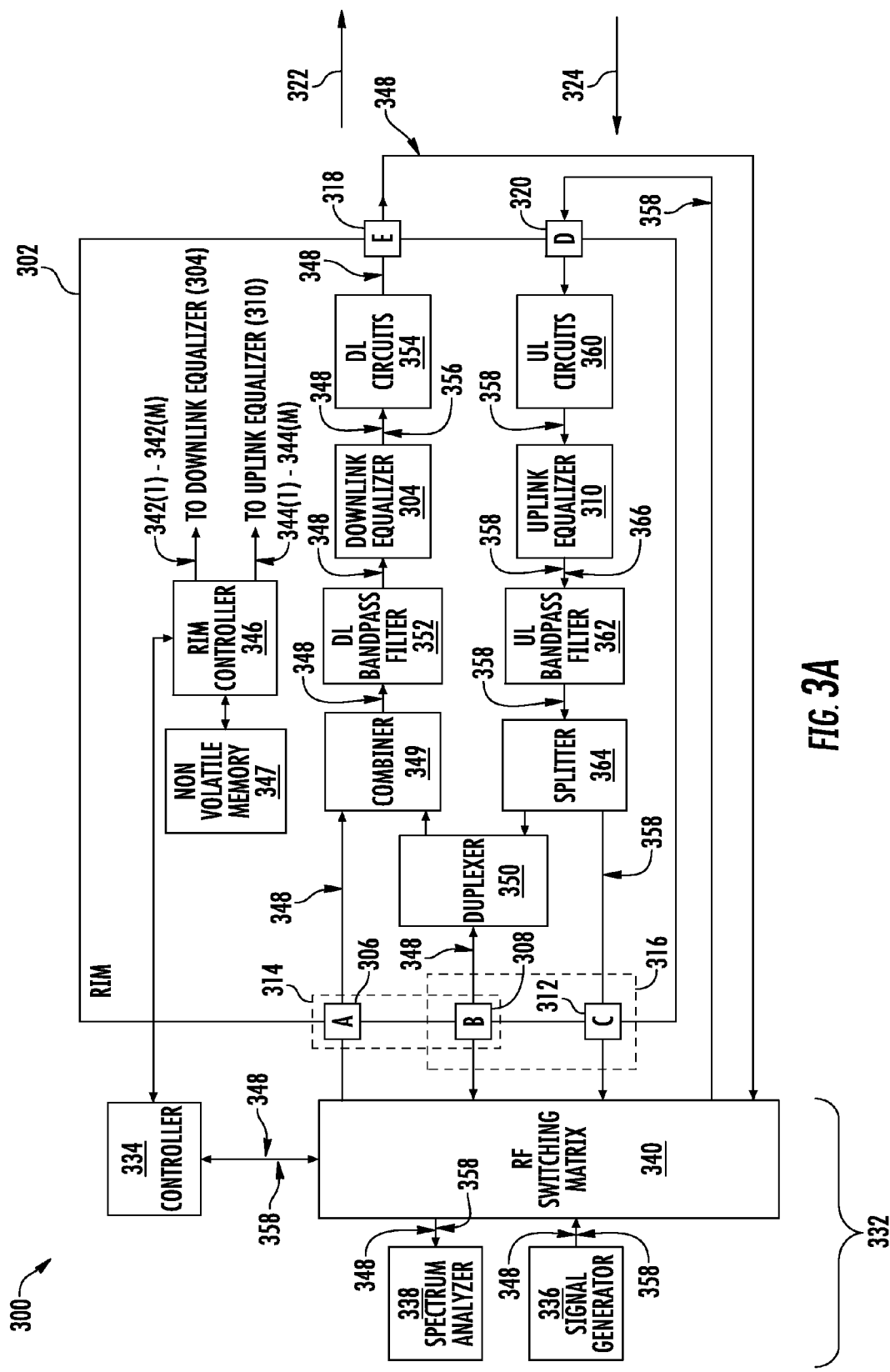
FIG. 3A is a schematic diagram of an exemplary system for optimizing ripple reductions in at least one RIM configured to share a downlink equalizer between a downlink simplex port and a duplex port and to share an uplink equalizer between the duplex port and an uplink simplex port.

In this regard, FIG. 3A is a schematic diagram of an exemplary system 300 for optimizing ripple reductions in at least one RIM 302 configured to share a downlink equalizer 304 (also known as downlink path equalizer or digitally controlled downlink equalizer) between a downlink simplex port 306 (also known as port A) and a duplex port 308 (also known as port B) and to share an uplink equalizer 310 (also known as uplink path equalizer or digitally controlled uplink equalizer) between the duplex port 308 and an uplink simplex port 312 (also known as port C). In a non-limiting example, the downlink simplex port 306 is functionally equivalent to the first downlink simplex port 204(1), the second downlink simplex port 204(2), and the third downlink simplex port 204(3) of FIG. 2. The duplex port 308 is functionally equivalent to the first duplex port 206(1), the second duplex port 206(2), and the third duplex port 206(3) of FIG. 2. The uplink simplex port 312 is functionally equivalent to the first uplink simplex port 208(1), the second uplink simplex port 208(2), and the third uplink simplex port 208(3) of FIG. 2.

In this regard, either the downlink simplex port 306 or the duplex port 308 can be configured to receive a downlink communications signal (not shown), such as the first downlink communications signal 220(1), the second downlink communications signal 220(2), or the third downlink communications signal 220(3) of FIG. 2. As such, the downlink simplex port 306 and the duplex port 308 can be collectively referred to as at least one downlink port 314. Likewise, either the uplink simplex port 312 or the duplex port 308 can be configured to receive an uplink communications signal (not shown), such as the first uplink communications signal 222(1), the second uplink communications signal 222(2), or the third uplink communications signal 222(3) of FIG. 2. As such, the uplink simplex port 312 and the duplex port 308 can be collectively referred to as at least one uplink port 316.

With reference to FIG. 3A, the RIM 302 includes a downlink interface 318 (also known as port E) and an uplink interface 320 (also known as port D). The downlink interface 318 is configured to provide the downlink communications signal to a downlink path 322. The uplink interface 320 is configured to receive the uplink communications signal from an uplink path 324. To further illustrate the functions of the downlink port 314, the uplink port 316, the downlink interface 318, and the uplink interface 320 when the RIM 302 is provided in a DAS such as the DAS 200 of FIG. 2 for example, FIG. 3B is discussed next.

Figure 3B:
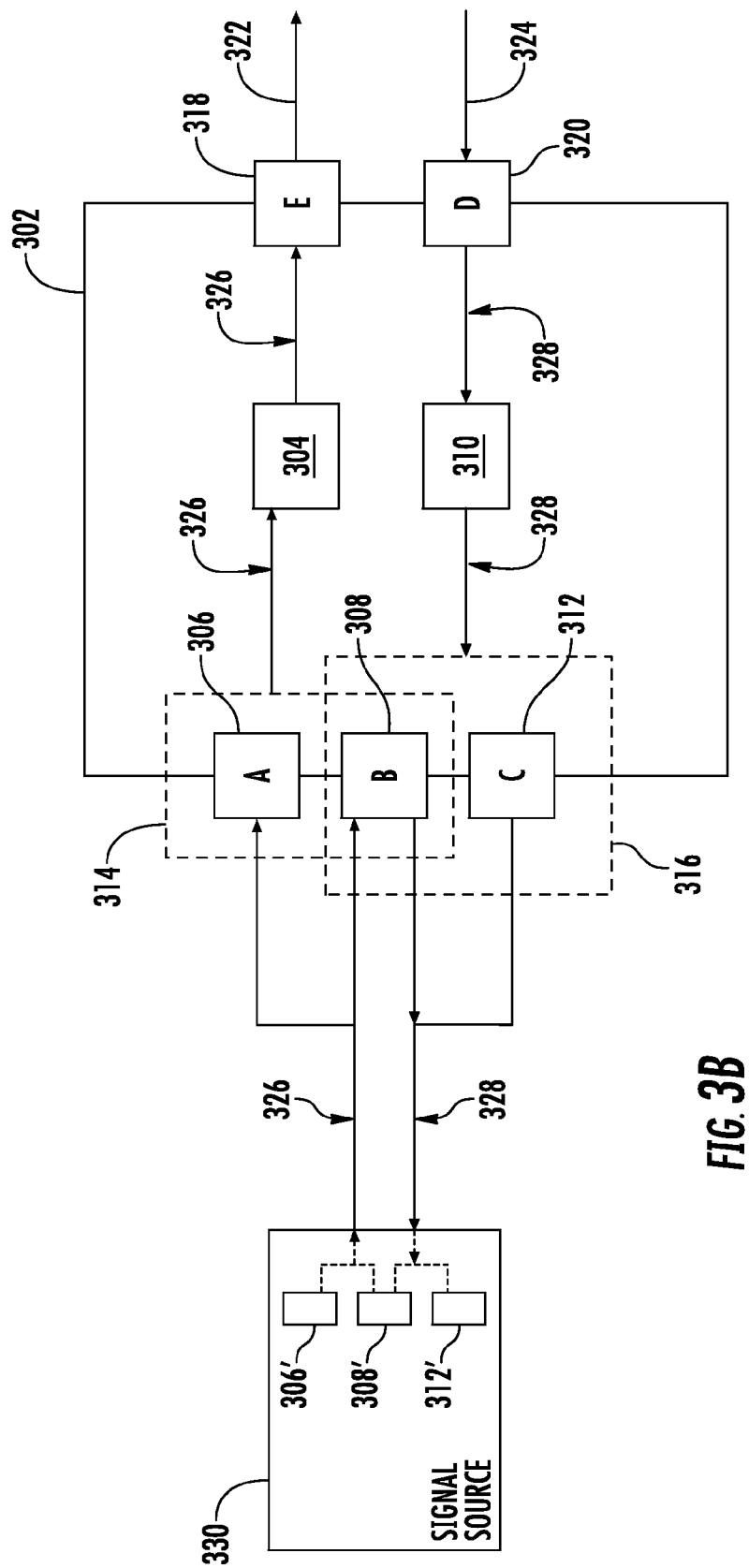
FIG. 3B is a schematic diagram of the RIM of FIG. 3A configured to receive a downlink communications signal and provide an uplink communications signal.

In this regard, FIG. 3B is a schematic diagram of the RIM 302 of FIG. 3A configured to receive a downlink communications signal 326 and provide an uplink communications signal 328. Common elements between FIGS. 3A and 3B are shown therein with common element numbers and will not be re-described herein.

With reference to FIG. 3B, the downlink port 314, which may be either the downlink simplex port 306 or the duplex port 308, is communicatively coupled to a signal source 330 to receive the downlink communications signal 326 in a downlink frequency spectrum (not shown). The signal source 330 includes a signal source downlink simplex port 306' and a signal source duplex port 308'. When the signal source 330 is configured to transmit the downlink communications signal 326 from the signal source downlink simplex port 306', the RIM 302 will be configured to receive the downlink communications signal 326 via the downlink simplex port 306. When the signal source 330 is configured to transmit the downlink communications signal 326 from the signal source duplex port 308', the RIM 302 will be configured to receive the downlink communications signal 326 via the duplex port 308. Regardless whether the RIM 302 receives the downlink communications signal 326 from the downlink simplex port 306 or the duplex port 308, the downlink communications signal 326 is provided to the downlink equalizer 304. In this regard, the downlink equalizer 304 is shared between the downlink simplex port 306 and the duplex port 308. As such, it is not necessary to provide two separate downlink equalizers for the downlink simplex port 306 and the duplex port 308, respectively. As a result, it is possible to save cost and reduce complexity in the RIM 302 while still improving frequency response flatness of the downlink communications signal 326.

In a non-limiting example, the downlink frequency spectrum is a personal communications service (PCS) downlink frequency band ranging from one thousand nine hundred thirty megahertz (1930 MHz) to one thousand nine hundred ninety-five megahertz (1995 MHz). The downlink equalizer 304 receives the downlink communications signal 326 from the downlink port 314. The downlink equalizer 304 is configured to minimize downlink ripple in the downlink communications signal 326 based on a predetermined downlink equalizer setting. The downlink interface 318 receives the downlink communications signal 326 from the downlink equalizer 304 and provides the downlink communications signal 326 to the downlink path 322.

The uplink interface 320 receives the uplink communications signal 328 in an uplink frequency spectrum from the uplink path 324. The signal source 330 includes a signal source uplink simplex port 312'. When the signal source 330 is configured to receive the uplink communications signal 328 from the signal source uplink simplex port 312', the RIM 302 will be configured to provide the uplink communications signal 328 via the uplink simplex port 312. When the signal source 330 is configured to receive the uplink communications signal 328 from the signal source duplex port 308', the RIM 302 will be configured to provide the uplink communications signal 328 from the duplex port 308. Regardless whether the RIM 302 provides the uplink communications signal 328 from the uplink simplex port 312 or the duplex port 308, the uplink communications signal 328 is received from the uplink equalizer 310. In this regard, the uplink equalizer 310 is shared between the uplink simplex port 312 and the duplex port 308. As such, it is not necessary to provide two separate uplink equalizers for the uplink simplex port 312 and the duplex port 308, respectively. As a result, it is possible to save cost and reduce complexity in the RIM 302 while still improving frequency response flatness of the uplink communications signal 328.

In a non-limiting example, the uplink frequency spectrum can be a PCS uplink frequency band ranging from one thousand eight hundred fifty megahertz (1850 MHz) to one thousand nine hundred fifteen megahertz (1915 MHz). The uplink equalizer 310 receives the uplink communications signal 328 from the uplink interface 320. The uplink equalizer 310 is configured to minimize uplink ripple in the uplink communications signal 328 based on a predetermined uplink equalizer setting. The uplink port 316, which may be either the uplink simplex port 312 or the duplex port 308, receives the uplink communications signal 328 from the uplink equalizer 310 and provides the uplink communications signal 328 to the signal source 330.

As mentioned above, the downlink equalizer 304 is configured to minimize the downlink ripple in the downlink communications signal 326 based on the predetermined downlink equalizer setting. Likewise, the uplink equalizer 310 is configured to minimize the uplink ripple in the uplink communications signal 328 based on the predetermined uplink equalizer setting. The predetermined downlink equalizer setting and the predetermined uplink equalizer setting can be determined based on the system 300 of FIG. 3A, which is further discussed next.

With reference back to FIG. 3A, a control system 332 is provided in the system 300 to define the predetermined downlink equalizer setting and the predetermined uplink equalizer setting for minimizing the downlink ripple and the uplink ripple, respectively. The control system 332 includes a controller 334, a signal generator 336, a spectrum analyzer 338, and a radio frequency (RF) switching matrix 340. In a non-limiting example, the control system 332 is functionally equivalent to automated test equipment (ATE).

To define the downlink equalizer setting for minimizing the downlink ripple in the downlink communications signal 326, the control system 332 commands the downlink equalizer 304 to go through a plurality of downlink equalizer states based on a plurality of downlink digital words 342(1)-342(M). Likewise, to define the uplink equalizer setting for minimizing the uplink ripple in the uplink communications signal 328, the control system 332 commands the uplink equalizer 310 to go through a plurality of uplink equalizer states based on a plurality of uplink digital words 344(1)-344(M). To help understand the downlink equalizer states and the uplink equalizer states, FIGS. 4A-4D are discussed next.

Figure 4A:
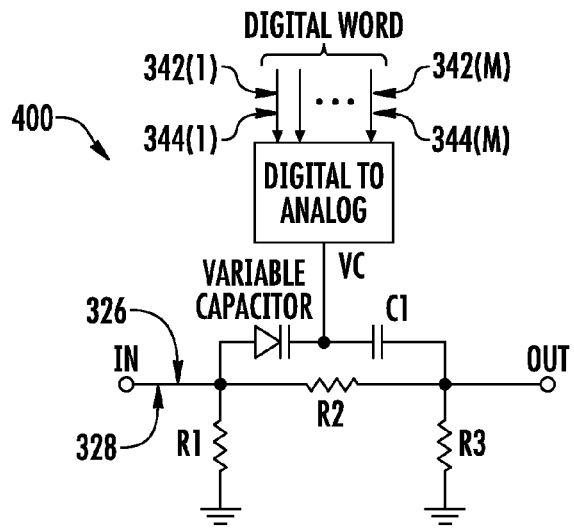
FIG. 4A is a schematic diagram of an exemplary equalizer that can function as the downlink equalizer and/or the uplink equalizer in the RIM of FIG. 3A.

In this regard, FIG. 4A is a schematic diagram of an exemplary equalizer 400 that can function as the downlink equalizer 304 and/or the uplink equalizer 310 in the RIM 302 of FIG. 3A. Common elements between FIGS. 3A, 3B, and 4A are shown therein with common element numbers and will not be re-described herein.

With reference to FIG. 4A, in a non-limiting example, the equalizer 400 is commercially available and includes PE64906, which is a DuNE™ technology-enhanced Digitally Tunable Capacitor. The equalizer 400 includes a tunable capacitor C1. In another non-limiting example, the tunable capacitor is based on Peregrine's UltraCMOS® technology, available from Peregrine Semiconductor of San Diego, Calif. The tunable capacitor C1 has a preconfigured capacitance range. In a non-limiting example, the tunable capacitor C1 can be digitally controlled via the downlink digital words 342(1)-342(M) or the uplink digital words 344(1)-344(M). Each of the downlink digital words 342(1)-342(M) or each of the uplink digital words 344(1)-344(M) sets the capacitor C1 to a specific capacitance within the preconfigured capacitance range.

In a non-limiting example, the preconfigured capacitance range is between one hundred microfarads (100 µF) and one thousand five hundred fifty microfarads (1550 µF) and is equally divided into thirty-two (32) capacitance steps. The 32 capacitance steps can be represented by the downlink digital words 342(1)-342(M) or the uplink digital words 344(1)-344(M), where M equals 32 in this non-limiting example. Accordingly, the downlink digital word 342(1) or the uplink digital word 344(1) sets the capacitor C1 to 100 µF capacitance, the downlink digital word 342(2) or the uplink digital word 344(2) sets the capacitor C2 to 150 µF capacitance, the downlink digital word 342(3) or the uplink digital word 344(3) sets the capacitor C1 to 200 µF capacitance, and so on. The 32 capacitance steps identify 32 downlink equalizer states when the equalizer 400 is provided as the downlink equalizer 304. The 32 downlink equalizer states are set by the downlink digital words 342(1)-342(M), where M equals 32. Likewise, the 32 capacitance steps identify 32 uplink equalizer states when the equalizer 400 is provided as the uplink equalizer 310. The 32 uplink equalizer states are set by the uplink digital words 344(1)-344(M), where M equals 32. By changing the capacitance of the capacitor C1, frequency response of the equalizer 400 will change accordingly. As is further discussed later, by changing the frequency response of the equalizer 400, it is possible to change a ripple of a signal (e.g., the downlink communications signal 326 and the uplink communications signal 328) passing through the equalizer 400.

Figure 4B:
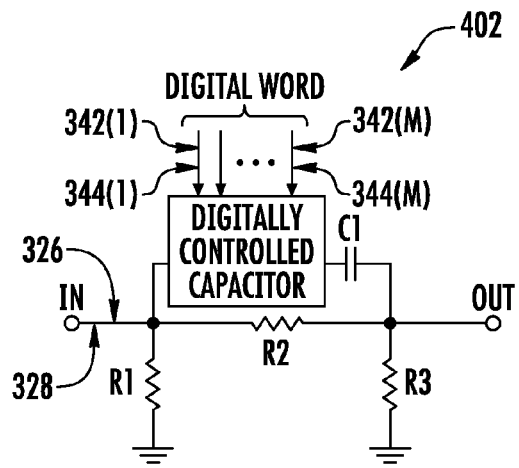
FIG. 4B is a schematic diagram of another exemplary equalizer that can function as the downlink equalizer and/or the uplink equalizer in the RIM of FIG. 3A.

FIG. 4B is a schematic diagram of another exemplary equalizer 402 that can function as the downlink equalizer 304 and/or the uplink equalizer 310 in the RIM 302 of FIG. 3A. Common elements between FIGS. 3A, 4A, and 4B are shown therein with common element numbers and will not be re-described herein. The equalizer 402 includes a tunable capacitor C1' having a preconfigured capacitance range and can be controlled by the downlink digital words 342(1)-342(M) or the uplink digital words 344(1)-344(M).

Figure 4C:
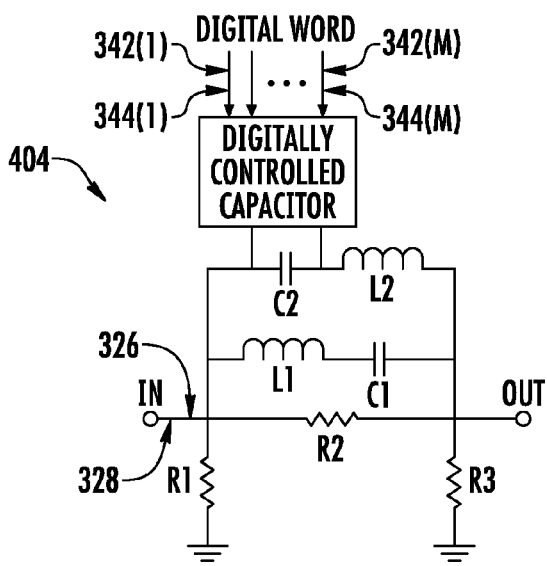
FIG. 4C is a schematic diagram of another exemplary equalizer that can function as the downlink equalizer and/or the uplink equalizer in the RIM of FIG. 3A.

FIG. 4C is a schematic diagram of another exemplary equalizer 404 that can function as the downlink equalizer 304 and/or the uplink equalizer 310 in the RIM 302 of FIG. 3A. Common elements between FIGS. 3A, 4A, and 4C are shown therein with common element numbers and will not be re-described herein. The equalizer 404 includes a tunable capacitor C2 having a preconfigured capacitance range and can be controlled by the downlink digital words 342(1)-342(M) or the uplink digital words 344(1)-344(M).

FIG. 4D is a table 406 providing exemplary illustration of the downlink digital words 342(1)-342(M) or the uplink digital words 344(1)-344(M) for controlling the equalizers 400, 402, and 404 in FIGS. 4A-4C. The table 406 corresponds to settings that may be used for the equalizers 400, 402, and 404. According to the non-limiting example discussed in FIG. 4A, the table 406 has 32 cells representing 32 downlink digital words 342(1)-342(M) or uplink digital words 344(1)-344(M), where M equals 32, for setting the equalizers 400, 402, and 404 to 32 equalizer states. In a non-limiting example, each of the 32 cells in the table 406 may be implemented as a register.

With reference back to FIG. 3A, the RIM 302 includes a RIM controller 346 and a non-volatile memory 347. In a non-limiting example, the non-volatile memory 347 stores the table 406 of FIG. 4D. As such, the non-volatile memory 347 stores the downlink digital words 342(1)-342(M) for setting the downlink equalizer 304 to the downlink equalizer states. The non-volatile memory 347 also stores the uplink digital words 344(1)-344(M) for setting the uplink equalizer 310 to uplink equalizer states.

In the downlink path 322, to define the predetermined downlink equalizer setting for minimizing the downlink ripple in the RIM 302, the controller 334 controls the RIM controller 346 to command the downlink equalizer 304 to go through the downlink equalizer states based on the downlink digital words 342(1)-342(M), respectively. For each of the downlink equalizer states set by the downlink digital words 342(1)-342(M), the controller 334 controls the signal generator 336 to generate a downlink test signal 348 that includes one or more predefined downlink frequency steps across the downlink frequency spectrum of the downlink communications signal 326. According to the non-limiting example previously discussed, the downlink frequency spectrum of the downlink communications signal 326 is the PCS downlink frequency band ranging from 1930 MHz to 1995 MHz. Accordingly, the predefined downlink frequency steps are divided across the 1930-1995 MHz PCS downlink frequency band. In a non-limiting example, the predefined downlink frequency steps are discrete frequency steps and each of the predefined downlink frequency steps is one hundred kilohertz (100 KHz). In this regard, the downlink PCS frequency band (1930-1995 MHz) can be divided into two hundred fifty (250) predefined downlink frequency steps.

The signal generator 336 provides the downlink test signal 348 to the RF switching matrix 340. The RF switching matrix 340 provides the downlink test signal 348 to the downlink simplex port 306 if the downlink simplex port 306 is configured to receive the downlink communications signal 326 of FIG. 3B. The RF switching matrix 340 provides the downlink test signal 348 to the duplex port 308 if the duplex port 308 is configured to receive the downlink communications signal 326 of FIG. 3B. A combiner 349 receives the downlink test signal 348 directly from the downlink simplex port 306 or from the duplex port 308 via a duplexer 350. The combiner 349 provides the downlink test signal 348 to a downlink bandpass filter 352. The downlink equalizer 304 receives the downlink test signal 348 from the downlink bandpass filter 352 and provides the downlink test signal 348 to downlink circuits 354. The downlink circuits 354 provide the downlink test signal 348 to the downlink interface 318. The RF switching matrix 340 receives the downlink test signal 348 from the downlink interface 318 and provides the downlink test signal 348 to the spectrum analyzer 338 and the controller 334.

With continuing reference to FIG. 3A, when the downlink test signal 348 passes through the downlink equalizer 304 at a respective downlink equalizer state among the downlink equalizer states, the downlink equalizer 304 generates a downlink equalizer frequency response 356 in response to collective effect of the predefined downlink frequency steps that sweep the downlink frequency spectrum of the downlink communications signal 326. As a result, the downlink ripple of the RIM 302 may be altered.

In this regard, FIG. 5 is a graph 500 providing an exemplary illustration of the downlink equalizer frequency response 356 of FIG. 3A that can change the downlink ripple of the RIM 302. Common elements between FIGS. 3A and 5 are shown therein with common element numbers and will not be re-described herein.

With reference to FIG. 5, the RIM 302 (not shown) will have a RIM frequency response 502 corresponding to a first ripple 504 if the downlink equalizer 304 (not shown) is not provided in the downlink path 322 (not shown) of the RIM 302. When the downlink equalizer 304 is provided in the downlink path 322, the downlink equalizer 304 generates the downlink equalizer frequency response 356 in response to receiving the downlink test signal 348 (not shown). When the downlink equalizer frequency response 356 combines with the RIM frequency response 502, a combined frequency response 506 is generated. As shown in FIG. 5, the combined frequency response 506 has a second ripple 508 that is smaller than the first ripple 504. As such, it is possible to control the downlink ripple of the RIM 302 by changing the downlink equalizer frequency response 356.

With reference back to FIG. 3A, the controller 334 receives the downlink test signal 348 from the downlink interface 318 via the RF switching matrix 340. The controller 334 measures and records the downlink ripple, such as the second ripple 508 of FIG. 5 for example, of the RIM 302 in association with the respective downlink equalizer state of the downlink equalizer 304 based on the downlink test signal 348. In a non-limiting example, the controller 334 may record the downlink ripple of the RIM 302 in the non-volatile memory 347.

In this regard, after the downlink test signal 348 passes through the downlink equalizer 304 at all of the downlink equalizer states respectively associated with the downlink digital words 342(1)-342(M), the controller 334 will measure and record a plurality of downlink ripples corresponding to the downlink equalizer states. The controller 334 is configured to examine the recorded downlink ripples corresponding to the downlink equalizer states, respectively. The controller 334 can than define the predetermined downlink equalizer setting as the downlink equalizer state among the downlink equalizer states that is associated with the smallest recorded downlink ripple among the recorded downlink ripples. In this regard, the controller 334 can configure the downlink equalizer 304 to minimize the downlink ripple in the RIM 302 based on the predetermined downlink equalizer setting. In a non-limiting example, since the downlink equalizer states are respectively determined by the downlink digital words 342(1)-342(M), the controller 334 configures the downlink equalizer 304 to the downlink digital word among the downlink digital words 342(1)-342(M) that causes the smallest recorded downlink ripple among the recorded downlink ripples.

The controller 334 is configured to minimize the downlink ripple of the RIM 302 based on a process. In this regard, FIG. 6 is a flowchart of an exemplary downlink ripple reduction process 600 that the controller 334 of FIG. 3A can employ to minimize the downlink ripple of the RIM 302.

Figure 6:
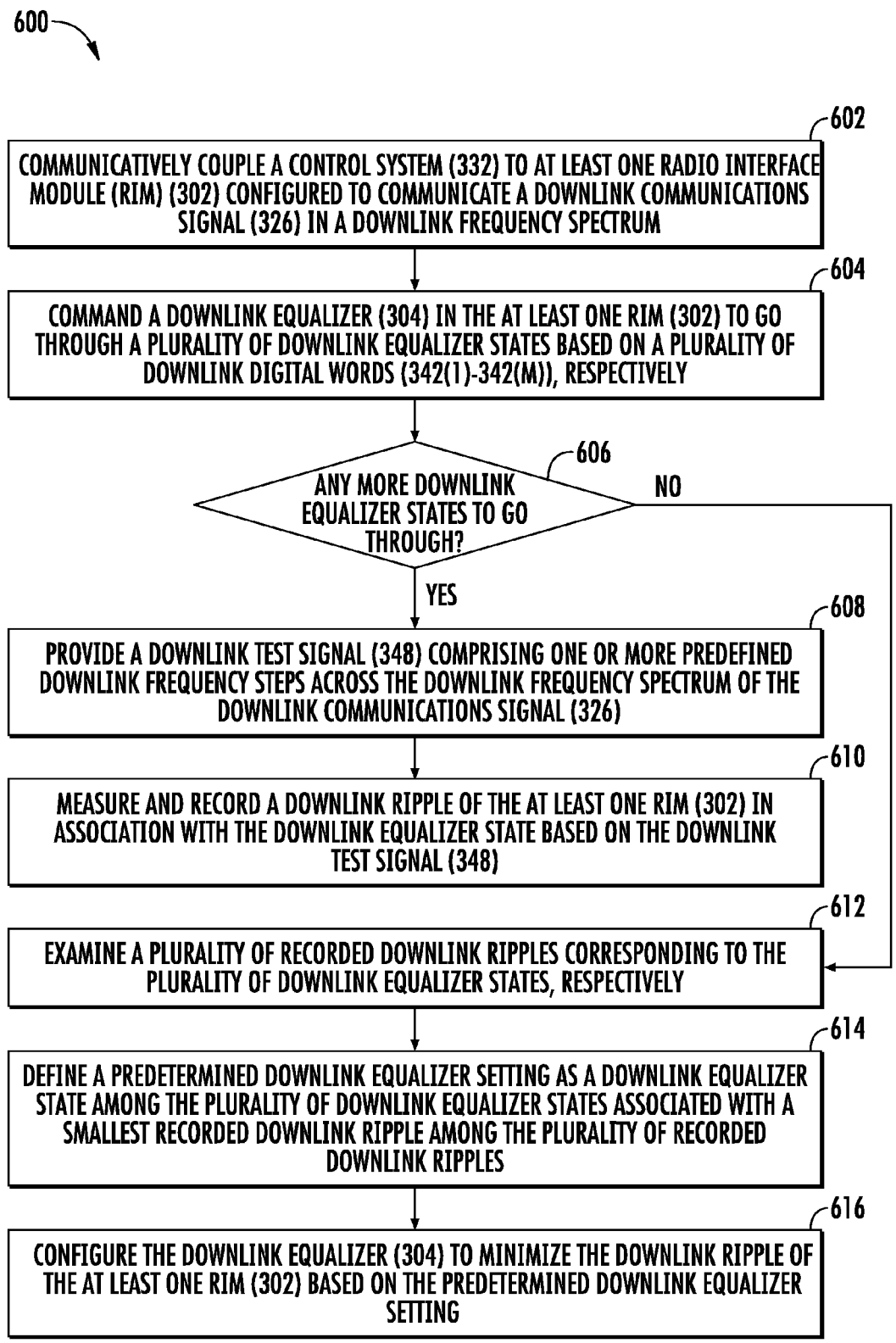
FIG. 6 is a flowchart of an exemplary downlink ripple reduction process that can be employed to minimize downlink ripple of the RIM of FIG. 3A.

With reference to FIG. 6, the control system 332 is communicatively coupled to the RIM 302 configured to communicate the downlink communications signal 326 in the downlink frequency spectrum (block 602). The controller 334 in the control system 332 commands the downlink equalizer 304 in the RIM 302 to go through the downlink equalizer states based on the downlink digital words 342 (1)-342(M), respectively (block 604). The controller 334 checks whether there are any more equalization states for the downlink equalizer 304 to go through (block 606). If there are more equalization states for the downlink equalizer 304 to go through, the controller 334 provides the downlink test signal 348 comprising the one or more predetermined downlink frequency steps across the downlink frequency spectrum of the downlink communications signal 326 (block 608). The controller 334 then measures and records a downlink ripple of the RIM 302 in association with the downlink equalizer state based on the downlink test signal 348 (block 610).

If there are no more equalization states for the downlink equalizer 304 to go through, the controller 334 examines the plurality of recorded downlink ripples corresponding to the downlink equalizer states, respectively (block 612). The controller 334 defines the predetermined downlink equalizer setting as the downlink equalizer state among the downlink equalizer states associated with the smallest recorded downlink ripple among the recorded downlink ripples (block 614). The controller 334 then configures the downlink equalizer 304 to minimize the downlink ripple of the RIM 302 based on the predetermined downlink equalizer setting (block 616).

With reference back to FIG. 3A, in the uplink path 324, to define the predetermined uplink equalizer setting for minimizing the uplink ripple in the RIM 302, the controller 334 controls the RIM controller 346 to command the uplink equalizer 310 to go through the uplink equalizer states based on the uplink digital words 344(1)-344(M), respectively. For each of the uplink equalizer states set by the uplink digital words 344(1)-344(M), the controller 334 controls the signal generator 336 to generate an uplink test signal 358 that includes one or more predefined uplink frequency steps across the uplink frequency spectrum of the uplink communications signal 328. According to the non-limiting example previously discussed, the uplink frequency spectrum of the uplink communications signal 328 is the PCS uplink frequency band ranging from 1850 MHz to 1915 MHz. Accordingly, the predefined uplink frequency steps are divided across the 1850-1915 MHz PCS uplink frequency band. In a non-limiting example, the predefined uplink frequency steps are discrete frequency steps and each of the predefined uplink frequency steps is 100 KHz. In this regard, the uplink PCS frequency band (1850-1915 MHz) can be divided into 250 predefined uplink frequency steps.

The signal generator 336 provides the uplink test signal 358 to the RF switching matrix 340. The RF switching matrix 340 provides the uplink test signal 358 to uplink interface 320. Uplink circuits 360 in the RIM 302 receive the uplink test signal 358 from the uplink interface 320 and provide the uplink test signal 358 to the uplink equalizer 310. An uplink bandpass filter 362 receives the uplink test signal 358 from the uplink equalizer 310 and provides the uplink test signal 358 to a splitter 364. The splitter 364 provides the uplink test signal 358 to the uplink simplex port 312 if the uplink simplex port 312 is configured to provide the uplink communications signal 328 of FIG. 3B to the signal source 330. In contrast, if the duplex port 308 is configured to provide the uplink communications signal 328 of FIG. 3B to the signal source 330, the splitter 364 provides the uplink test signal 358 to the duplex port 308 via the duplexer 350. The RF switching matrix 340 receives the uplink test signal 358 from the uplink simplex port 312 or the duplex port 308. The RF switching matrix 340 provides the uplink test signal 358 to the spectrum analyzer 338 and the controller 334.

With continuing reference to FIG. 3A, when the uplink test signal 358 passes through the uplink equalizer 310 at a respective uplink equalizer state among the uplink equalizer states, the uplink equalizer 310 generates an uplink equalizer frequency response 366 in response to collective effect of the predefined uplink frequency steps that sweep the uplink frequency spectrum of the uplink communications signal 328. As a result, the uplink ripple of the RIM 302 may be altered.

The controller 334 receives the uplink test signal 358 from the RF switching matrix 340. The controller 334 measures and records the uplink ripple of the RIM 302 in association with the respective uplink equalizer state of the uplink equalizer 310 based on the uplink test signal 358. In a non-limiting example, the controller 334 may record the uplink ripple of the RIM 302 in the non-volatile memory 347.

In this regard, after the uplink test signal 358 passes through the uplink equalizer 310 at all of the uplink equalizer states associated with the uplink digital words 344(1)-344(M), the controller 334 will measure and record a plurality of uplink ripples corresponding to the uplink equalizer states. The controller 334 is configured to examine the recorded uplink ripples corresponding to the uplink equalizer states, which are associated with the uplink digital words 344(1)-344(M), respectively. The controller 334 can than define the predetermined uplink equalizer setting as the uplink equalizer state among the uplink equalizer states that is associated with the smallest recorded uplink ripple among the recorded uplink ripples. In this regard, the controller 334 can configure the uplink equalizer 310 to minimize the uplink ripple in the RIM 302 based on the predetermined uplink equalizer setting. In a non-limiting example, since the uplink equalizer states are respectively determined by the uplink digital words 344(1)-344(M), the controller 334 configures the uplink equalizer 310 to the uplink digital word among the uplink digital words 344(1)-344(M) that causes the smallest recorded uplink ripple among the recorded uplink ripples.

As previously discussed in FIG. 3B, the RIM 302 is configured to receive the downlink communications signal 326 from the downlink simplex port 306 when the signal source 330 is configured to transmit the downlink communications signal from the signal source downlink simplex port 306'. The RIM 302 is configured to receive the downlink communications signal 326 from the duplex port 308 when the signal source 330 is configured to transmit the downlink communications signal from the signal source duplex port 308'. Likewise, the RIM 302 is configured to provide the uplink communications signal 328 from the uplink simplex port 312 when the signal source 330 is configured to receive the uplink communications signal from the signal source uplink simplex port 312'. The RIM 302 is configured to provide the uplink communications signal 328 from the duplex port 308 when the signal source 330 is configured to receive the uplink communications signal from the signal source duplex port 308'.

As such, it is necessary to optimize the downlink equalizer 304 and the uplink equalizer 310 by routing the downlink test signal 348 and the uplink test signal 358 to the ports (e.g., the downlink simplex port 306, the duplex port 308, and the uplink simplex port 312) that the RIM 302 is configured to receive the downlink communications signal 326 and provide the uplink communications signal 328. The various port configurations for optimizing the downlink equalizer 304 and the uplink equalizer 310 are summarized in Table 1 below.

TABLE 1

| Port configured for downlink (DL) and uplink (UL) communications | Configuration for optimizing the downlink equalizer (304) | | Configuration for optimizing the uplink equalizer (310) | |
|---|---|---|---|---|
| | Signal generator (336) connected to port: | Spectrum Analyzer (338) connected to port: | Signal Generator (336) connected to port: | Spectrum Analyzer (338) connected to port: |
| DL - duplex port (308) UL - duplex port (308) | Duplex port (308) | Downlink interface (318) | Uplink interface (320) | Duplex port (308) |
| DL - duplex port (308) UL - uplink simplex port (312) | | | | Uplink simplex port (312) |
| DL - downlink simplex port (306) UL - uplink simplex port (312) | Downlink simplex port (306) | | | |
| DL - downlink simplex port (306) UL - duplex port (308) | | | | Duplex port (308) |

Figure 7:
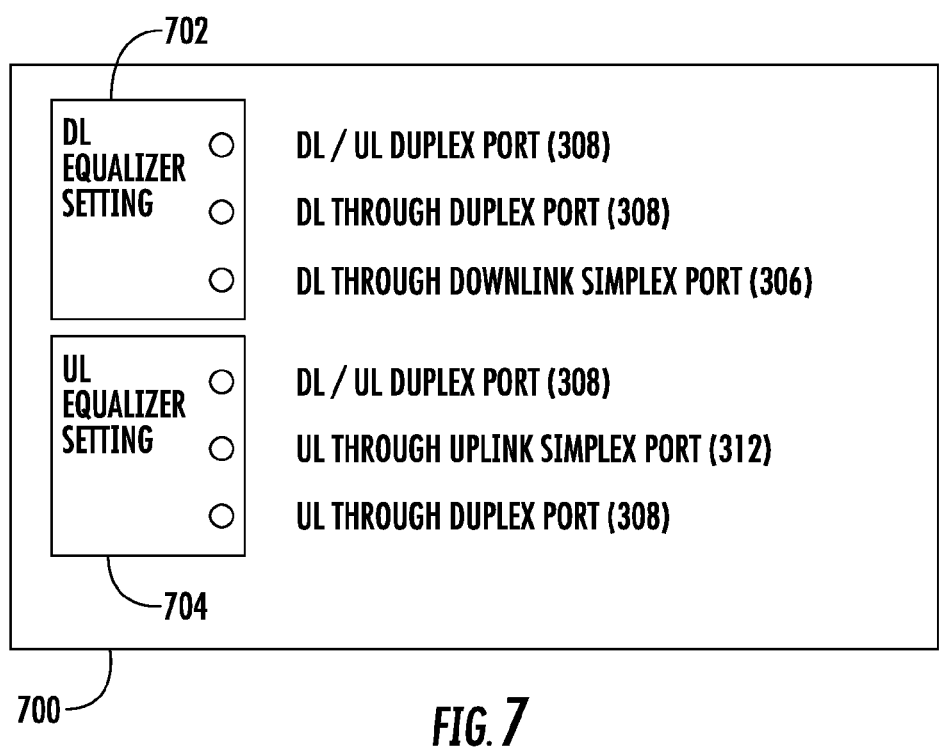
FIG. 7 is an exemplary graphical user interface (GUI) that can be used to configure the RIM of FIG. 3A for optimizing the downlink equalizer and/or the uplink equalizer.

The port configurations summarized in Table 1 can be performed via a graphical user interface (GUI), which can be provided by the controller 334 for example. In this regard, FIG. 7 is an exemplary GUI 700 that can be used to configure the RIM 302 for optimizing the downlink equalizer 304 and/or the uplink equalizer 310 (shown in FIG. 3A). Common elements between FIGS. 3A and 7 are shown therein with common element numbers and will not be re-described herein.

With reference to FIG. 7, the GUI 700 includes a downlink equalizer setting window 702 that can be used to connect the signal generator 336 and the spectrum analyzer 338 for optimizing the downlink equalizer 304 (shown in FIG. 3A). The GUI 700 includes an uplink equalizer setting window 704 that can be used to connect the signal generator 336 and the spectrum analyzer 338 for optimizing the uplink equalizer 310 (shown in FIG. 3A).

Figure 8A:
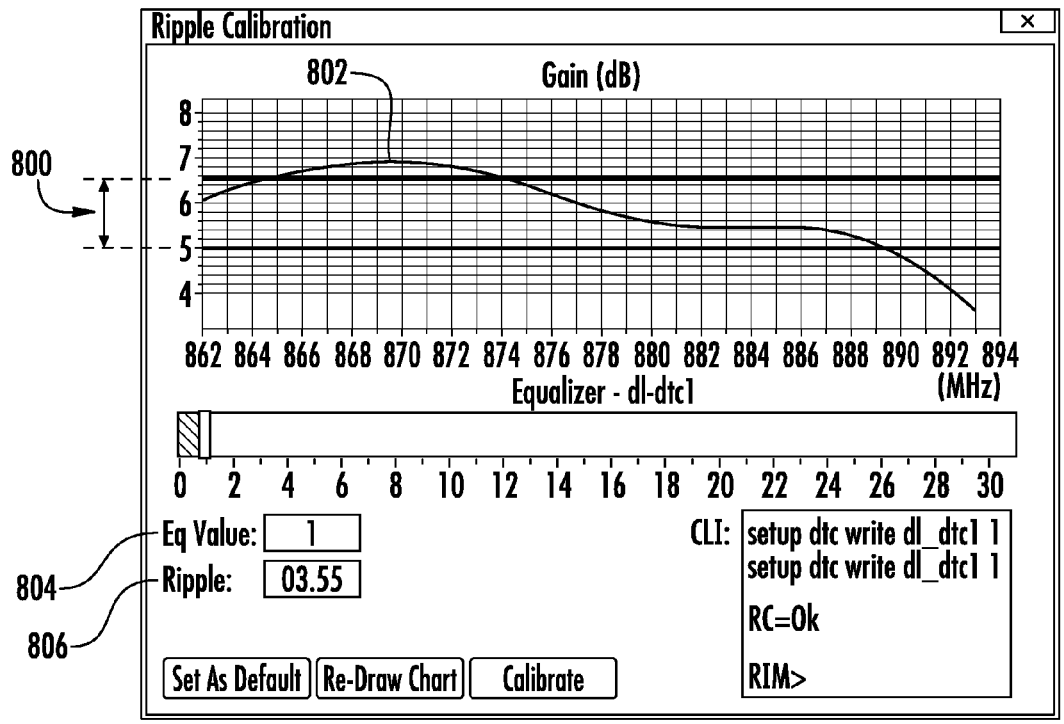
FIGS. 8A-8F illustrate exemplary downlink ripple of the RIM of FIG. 3A corresponding to different downlink equalizer states.

With reference back to FIG. 3A, in a non-limiting example, when the controller 334 commands the downlink equalizer 304 to go through the downlink equalizer states based on the downlink digital words 342(1)-342(M), the downlink ripple of the RIM 302 can be displayed and/or recorded on the spectrum analyzer 338. In this regard, FIGS. 8A-8F illustrate exemplary downlink ripple of the RIM 302 corresponding to different downlink equalizer states. In a non-limiting example, an ideal gain band 800 is determined to lie between five decibels (5 dB) and six and half decibels (6.5 dB), as illustrated in FIG. 8A.

FIG. 8A illustrates a first downlink ripple 802 of the RIM 302 when the downlink equalizer 304 (not shown) is set to a first downlink equalizer state corresponding to a first downlink digital word of one (1) as shown in an eq. value box 804. Accordingly, the first downlink ripple 802 is 3.55 dB, as shown in a ripple box 806.

Figure 8B:
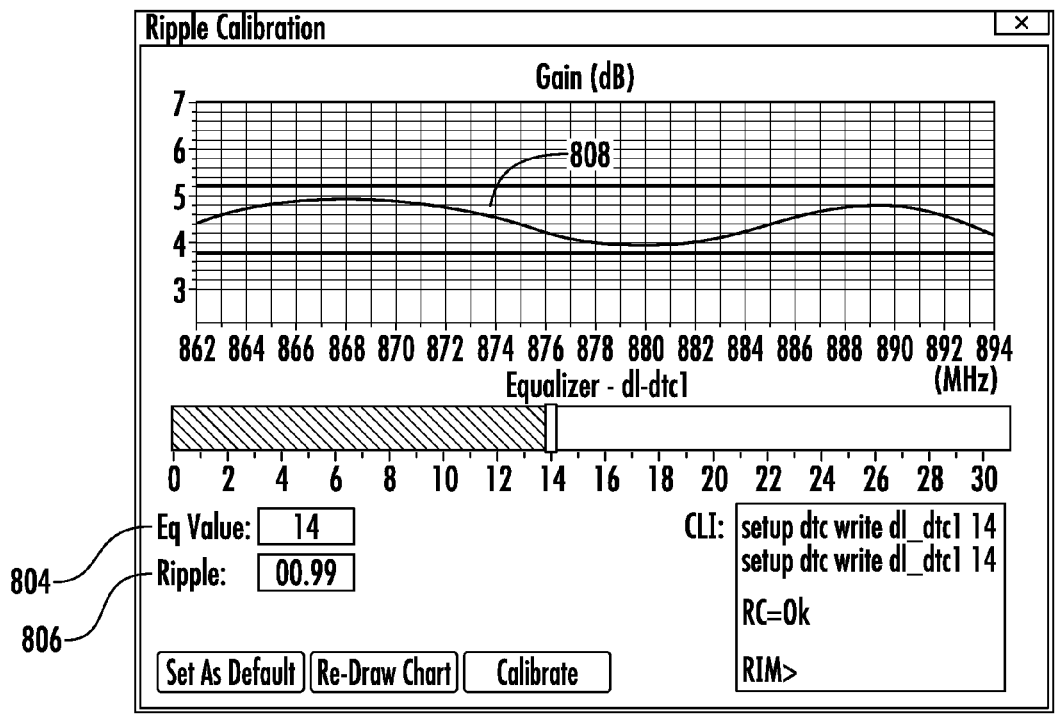

FIG. 8B illustrates a second downlink ripple 808 of the RIM 302 when the downlink equalizer 304 (not shown) is set to a second downlink equalizer state corresponding to a second downlink digital word of fourteen (14) as shown in the eq. value box 804. Accordingly, the second downlink ripple 808 is 0.99 dB, as shown in the ripple box 806.

Figure 8C:
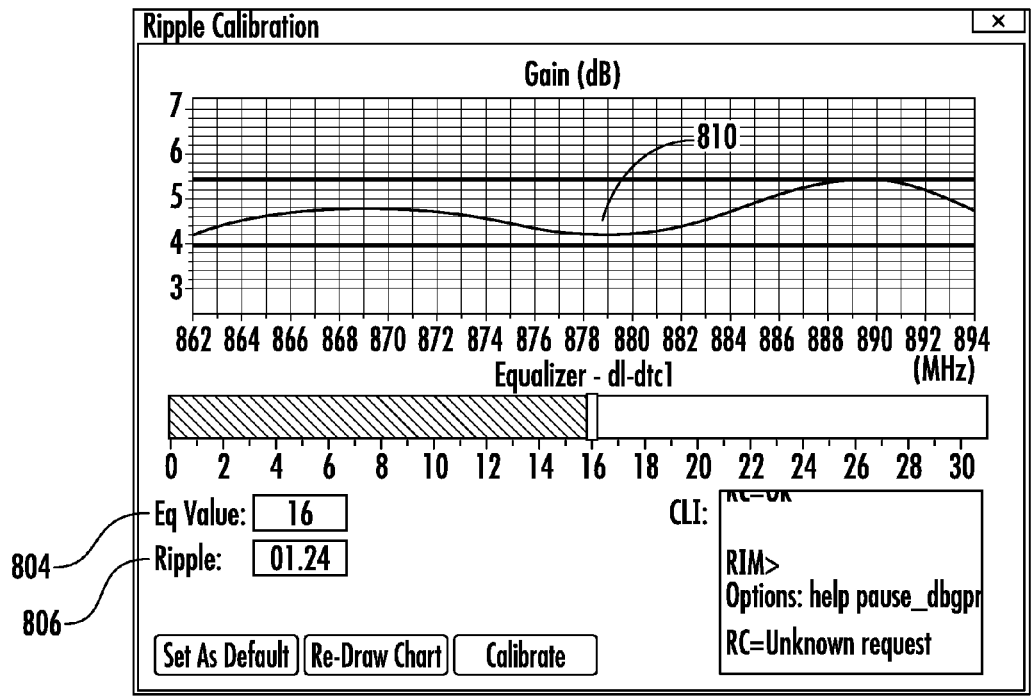

FIG. 8C illustrates a third downlink ripple 810 of the RIM 302 when the downlink equalizer 304 (not shown) is set to a third downlink equalizer state corresponding to a third downlink digital word of sixteen (16) as shown in the eq. value box 804. Accordingly, the third downlink ripple 810 is 1.24 dB, as shown in the ripple box 806.

Figure 8D:
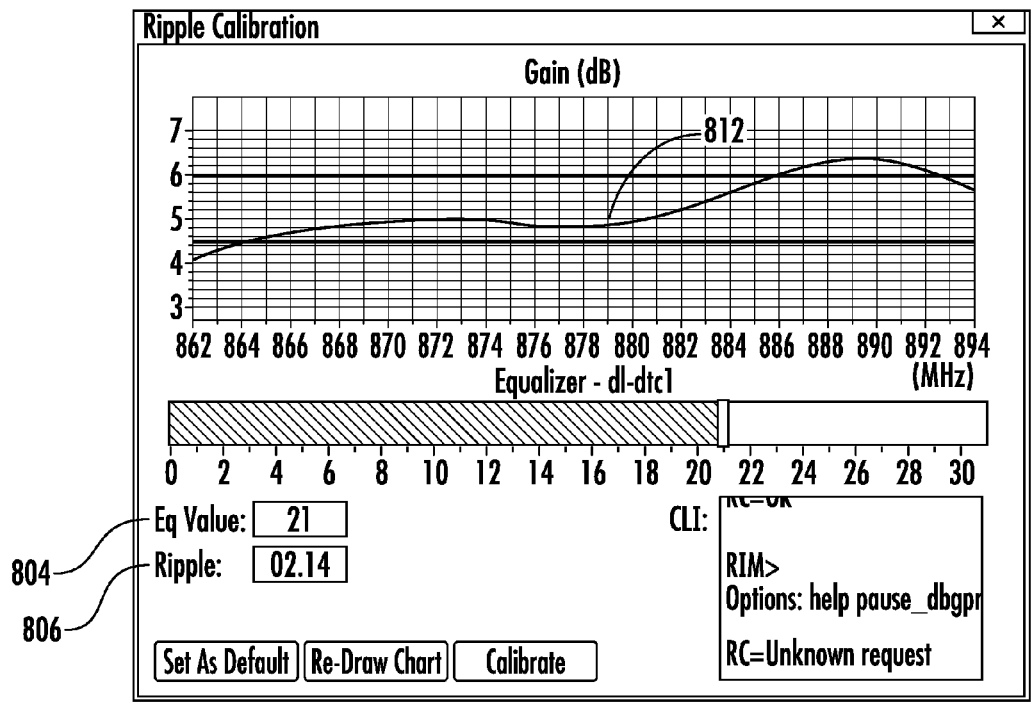

FIG. 8D illustrates a fourth downlink ripple 812 of the RIM 302 when the downlink equalizer 304 (not shown) is set to a fourth downlink equalizer state corresponding to a fourth downlink digital word of twenty one (21) as shown in the eq. value box 804. Accordingly, the fourth downlink ripple 812 is 2.14 dB, as shown in the ripple box 806.

Figure 8E:
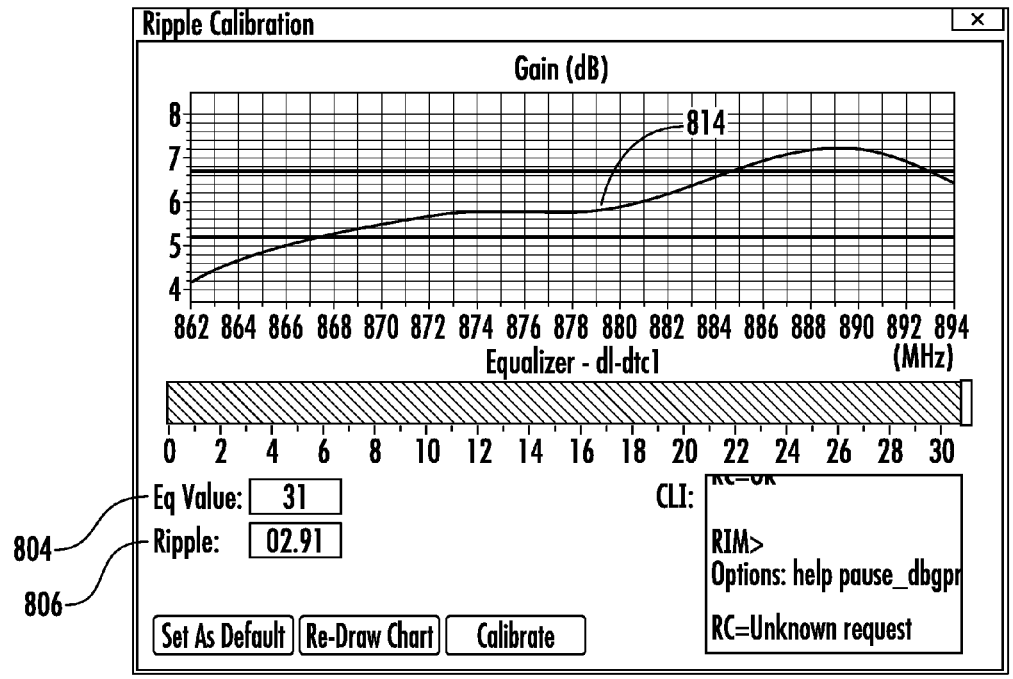

FIG. 8E illustrates a fifth downlink ripple 814 of the RIM 302 when the downlink equalizer 304 (not shown) is set to a fifth downlink equalizer state corresponding to a fifth downlink digital word of thirty one (31) as shown in the eq. value box 804. Accordingly, the fifth downlink ripple 814 is 2.91 dB, as shown in the ripple box 806.

Figure 8F:
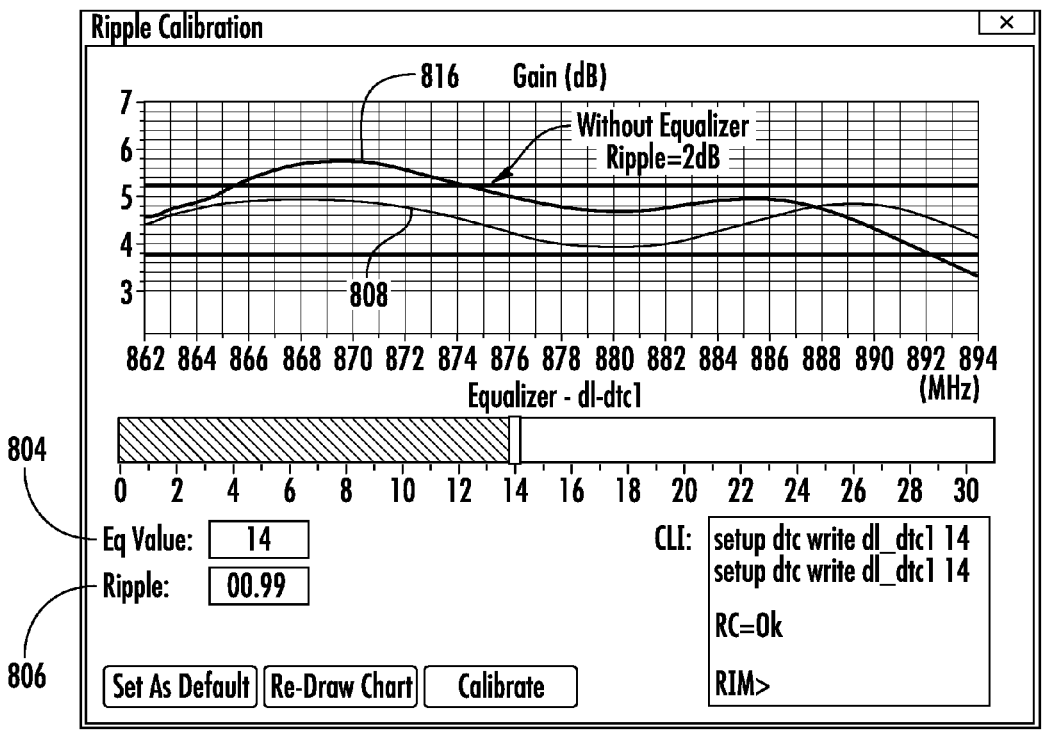

FIG. 8F illustrates the second downlink ripple 808 of FIG. 8B and a downlink ripple 816 of the RIM 302 when the downlink equalizer 304 (not shown) is not provided or disabled in the RIM 302. As shown in FIG. 8F, the downlink ripple 816 of the RIM 302 is two decibels (2 dB).

Figure 9:
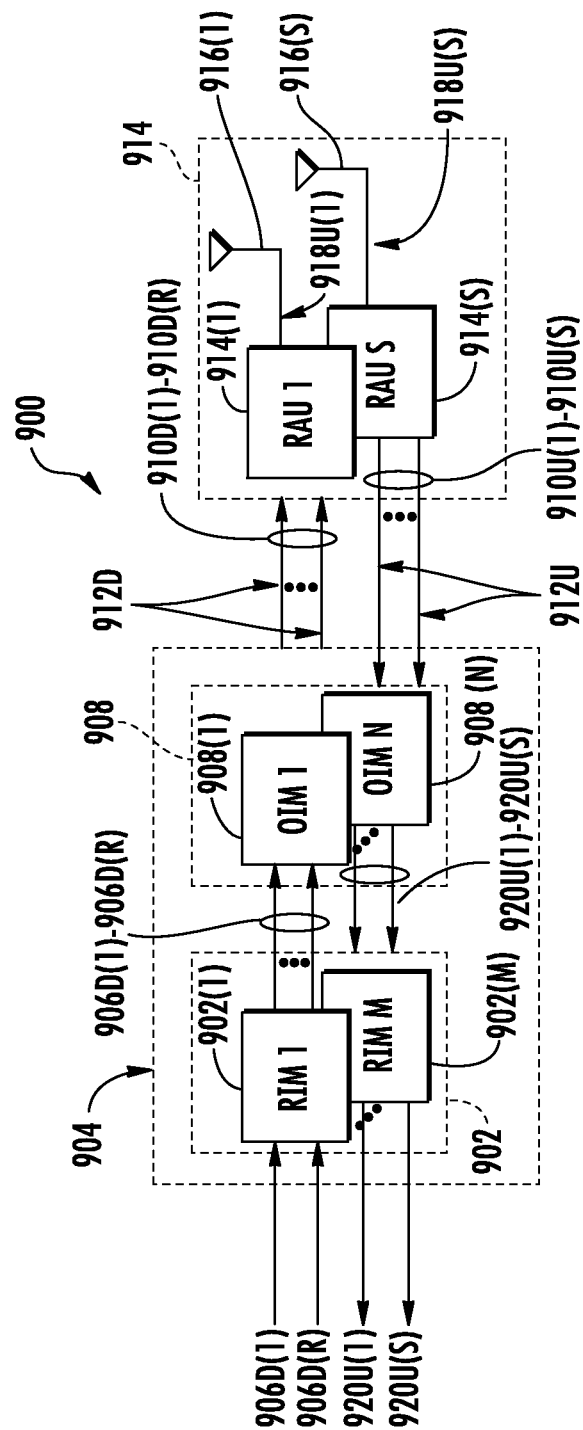
FIG. 9 is a schematic diagram of an exemplary DAS that can include the RIM of FIGS. 3A and 3B.

FIG. 9 is a schematic diagram of an exemplary DAS 900 that can include the RIM 302 of FIGS. 3A and 3B. In this example, the DAS 900 is an optical fiber-based DAS 900. The DAS 900 includes an optical fiber for distributing communications services for multiple frequency bands. The DAS 900 in this example is comprised of three (3) main components. One or more radio interfaces provided in the form of RIMs 902(1)-902(M) are provided in a central unit 904 to receive and process downlink electrical communications signals 906D(1)-906D(R) prior to optical conversion into downlink optical fiber-based communications signals. Any of the RIMs 902(1)-902(M) can be configured to function as the RIM 302 of FIGS. 3A and 3B. The downlink electrical communications signals 906D(1)-906D(R) may be received from a base station (not shown) as an example. The RIMs 902(1)-902(M) provide both downlink and uplink interfaces for signal processing. The notations "1-R" and "1-M" indicate that any number of the referenced component, 1-R and 1-M, respectively, may be provided. The central unit 904 is configured to accept the plurality of RIMs 902(1)-902(M) as modular components that can easily be installed and removed or replaced in the central unit 904. In one example, the central unit 904 is configured to support up to twelve (12) RIMs 902(1)-902(12). Each RIM 902(1)-902(M) can be designed to support a particular type of signal source or range of signal sources (i.e., frequencies) to provide flexibility in configuring the central unit 904 and the DAS 900 to support the desired signal sources.

For example, one RIM 902 may be configured to support the Personal Communication Services (PCS) radio band. Another RIM 902 may be configured to support the 800 MHz radio band. In this example, by inclusion of these RIMs 902, the central unit 904 could be configured to support and distribute communications signals on both PCS and LTE 700 radio bands, as an example. RIMs 902 may be provided in the central unit 904 that support any frequency bands desired, including but not limited to the US Cellular band, PCS band, Advanced Wireless Services (AWS) band, 700 MHz band, Global System for Mobile communications (GSM) 900, GSM 1800, and Universal Mobile Telecommunications System (UMTS). The RIMs 902(1)-902(M) may also be provided in the central unit 904 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

The RIMs 902(1)-902(M) may be provided in the central unit 904 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 9, the downlink electrical communications signals 906D(1)-906D(R) are provided to a plurality of optical interfaces provided in the form of optical interface modules (OIMs) 908(1)-908(N) in this embodiment to convert the downlink electrical communications signals 906D(1)-906D(R) into downlink optical fiber-based communications signals 910D(1)-910D(R). The notation "1-N" indicates that any number of the referenced component 1-N may be provided. The OIMs 908 may be configured to provide one or more optical interface components (OICs) that contain optical to electrical (O/E) and electrical to optical (E/O) converters, as will be described in more detail below. The OIMs 908 support the radio bands that can be provided by the RIMs 902, including the examples previously described above.

The OIMs 908(1)-908(N) each include E/O converters to convert the downlink electrical communications signals 906D(1)-906D(R) into the downlink optical fiber-based communications signals 910D(1)-910D(R). The downlink optical fiber-based communications signals 910D(1)-910D(R) are communicated over a downlink optical fiber-based communications medium 912D to a plurality of RAUs 914(1)-914(S), which may be remote antenna units ("RAUs 914(1)-914(S)"). The notation "1-S" indicates that any number of the referenced component 1-S may be provided. O/E converters provided in the RAUs 914(1)-914(S) convert the downlink optical fiber-based communications signals 910D(1)-910D(R) back into the downlink electrical communications signals 906D(1)-906D(R), which are provided to antennas 916(1)-916(S) in the RAUs 914(1)-914(S) to distribute to client devices (not shown) in the reception range of the antennas 916(1)-916(S).

E/O converters are also provided in the RAUs 914(1)-914(S) to convert uplink electrical communications signals 918U(1)-918U(S) received from client devices through the antennas 916(1)-916(S) into uplink optical fiber-based communications signals 910U(1)-910U(S). The RAUs 914(1)-914(S) communicate the uplink optical fiber-based communications signals 910U(1)-910U(S) over an uplink optical fiber-based communications medium 912U to the OIMs 908(1)-908(N) in the central unit 904. The OIMs 908(1)-908(N) include O/E converters that convert the received uplink optical fiber-based communications signals 910U(1)-910U(S) into uplink electrical communications signals 920U(1)-920U(S), which are processed by the RIMs 902(1)-902(M) and provided as uplink electrical communications signals 920U(1)-920U(S). The central unit 904 may provide the uplink electrical communications signals 920U(1)-920U(S) to a base station or other communications system.

Note that the downlink optical fiber-based communications medium 912D and the uplink optical fiber-based communications medium 912U connected to each RAU 914(1)-914(S) may be a common optical fiber-based communications medium, wherein for example, wave division multiplexing (WDM) may be employed to provide the downlink optical fiber-based communications signals 910D(1)-910D(R) and the uplink optical fiber-based communications signals 910U(1)-910U(S) on the same optical fiber-based communications medium.

Figure 10:
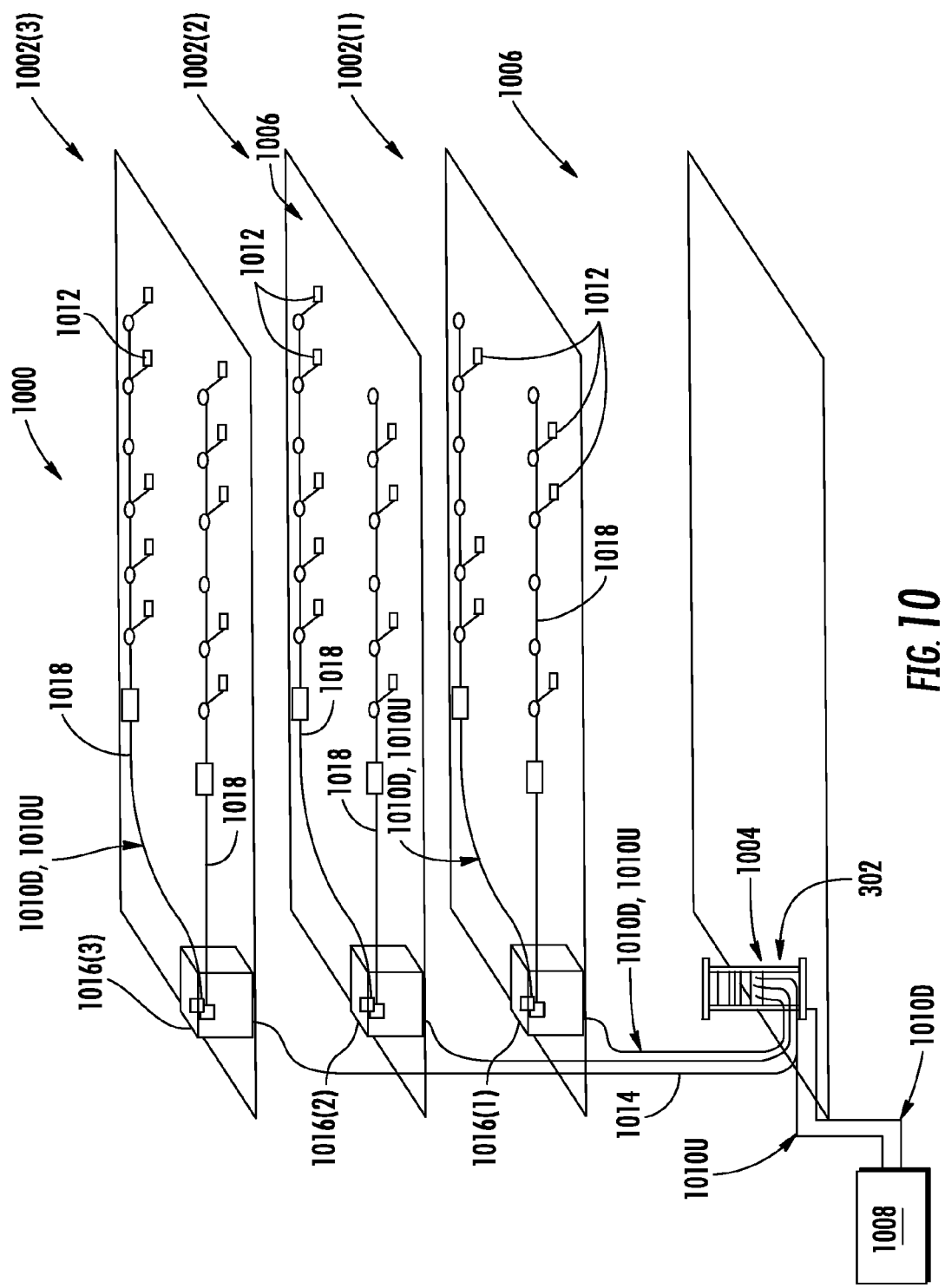
FIG. 10 is a partial schematic cut-away diagram of an exemplary building infrastructure in which DASs including the RIM of FIGS. 3A and 3B can be provided.

The RIM 302 of FIGS. 3A and 3B can be provided in a DAS provided in an indoor environment, as illustrated in FIG. 10. FIG. 10 is a partial schematic cut-away diagram of an exemplary building infrastructure 1000 in which DASs including the RIM 302 of FIGS. 3A and 3B can be employed. The building infrastructure 1000 in this embodiment includes a first (ground) floor 1002(1), a second floor 1002(2), and a third floor 1002(3). The floors 1002(1)-1002(3) are serviced by a central unit 1004 to provide antenna coverage areas 1006 in the building infrastructure 1000. The central unit 1004, which can include the RIM 302, is communicatively coupled to a base station 1008 to receive downlink communications signals 1010D from the base station 1008. The central unit 1004 is communicatively coupled to a plurality of remote units 1012 to distribute the downlink communications signals 1010D to the remote units 1012 and to receive uplink communications signals 1010U from the remote units 1012, as previously discussed above. The downlink communications signals 1010D and the uplink communications signals 1010U communicated between the central unit 1004 and the remote units 1012 are carried over a riser cable 1014. The riser cable 1014 may be routed through interconnect units (ICUs) 1016(1)-1016(3) dedicated to each of the floors 1002(1)-1002(3) that route the downlink communications signals 1010D and the uplink communications signals 1010U to the remote units 1012 and also provide power to the remote units 1012 via array cables 1018.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A system for optimizing ripple reductions in a distributed antenna system (DAS), comprising:
   at least one radio interface module (RIM), comprising:
      at least one downlink port configured to receive a downlink communications signal in a downlink frequency spectrum from a signal source;
      a downlink interface configured to provide the downlink communications signal to a downlink path; and
      a downlink equalizer configured to minimize downlink ripple in the at least one RIM based on a predetermined downlink equalizer setting; and
   a control system configured to:
      command the downlink equalizer to go through a plurality of downlink equalizer states based on a plurality of downlink digital words, respectively;
      for each downlink equalizer state of the plurality of downlink equalizer states:
         provide a downlink test signal to the at least one downlink port, wherein the downlink test signal comprises one or more predefined downlink frequency steps across the downlink frequency spectrum of the downlink communications signal; and
         measure and record a respective downlink ripple in association with each downlink equalizer state of the plurality of downlink equalizer states based on the downlink test signal;
      examine a plurality of recorded downlink ripples corresponding to the plurality of downlink equalizer states, respectively; and
      define the predetermined downlink equalizer setting as a downlink equalizer state among the plurality of downlink equalizer states associated with a smallest recorded downlink ripple among the plurality of recorded downlink ripples.

2. The system of claim 1, wherein the at least one downlink port is comprised of a downlink simplex port and a duplex port.

3. The system of claim 2, wherein:
   the downlink simplex port is configured to receive the downlink communications signal and provide the downlink communications signal to the downlink equalizer when the duplex port is decoupled from the signal source; and
   the duplex port is configured to receive the downlink communications signal and provide the downlink communications signal to the downlink equalizer when the downlink simplex port is decoupled from the signal source.

4. The system of claim 3, wherein the control system is configured to provide the downlink test signal to the downlink simplex port when the downlink simplex port is configured to receive the downlink communications signal.

5. The system of claim 3, wherein the control system is configured to provide the downlink test signal to the duplex port when the duplex port is configured to receive the downlink communications signal.

6. The system of claim 2, wherein the control system is configured to receive the downlink test signal at the downlink interface.

7. The system of claim 1, wherein the downlink equalizer is a digitally controlled downlink equalizer.

8. The system of claim 1, wherein the at least one RIM further comprises:
   a RIM controller configured to command the downlink equalizer to go through the plurality of downlink equalizer states based on the plurality of downlink digital words, respectively; and
   a non-volatile memory configured to record the downlink ripple in association with the downlink equalizer state for each downlink equalizer state of the plurality of downlink equalizer states.

9. The system of claim 8, wherein the control system comprises:
   a signal generator configured to generate the downlink test signal comprising the one or more predefined downlink frequency steps across the downlink frequency spectrum of the downlink communications signal;
   a spectrum analyzer configured to measure the downlink ripple of the at least one RIM for each downlink equalizer state of the plurality of downlink equalizer states; and
   a controller configured to:
      control the RIM controller to command the downlink equalizer to go through the plurality of downlink equalizer states based on the plurality of downlink digital words, respectively;
      examine the plurality of recorded downlink ripples corresponding to the plurality of downlink equalizer states, respectively; and define the predetermined downlink equalizer setting as the downlink equalizer state among the plurality of downlink equalizer states associated with the smallest recorded downlink ripple among the plurality of recorded downlink ripples.

10. The system of claim 9, wherein:
the at least one RIM further comprises:
an uplink interface configured to receive an uplink communications signal in an uplink frequency spectrum from an uplink path;
at least one uplink port configured to provide the uplink communications signal to the signal source; and
an uplink equalizer configured to minimize uplink ripple in the at least one RIM based on a predetermined uplink equalizer setting; and
the control system is further configured to:
command the uplink equalizer to go through a plurality of uplink equalizer states based on a plurality of uplink digital words, respectively;
for each uplink equalizer state of the plurality of uplink equalizer states:
provide an uplink test signal to the uplink interface, wherein the uplink test signal comprises one or more predefined uplink frequency steps across the uplink frequency spectrum of the uplink communications signal; and
measure and record a respective uplink ripple of the at least one RIM in association with each uplink equalizer state of the plurality of uplink equalizer states based on the uplink test signal;
examine a plurality of recorded uplink ripples corresponding to the plurality of uplink equalizer states, respectively; and
define the predetermined uplink equalizer setting as an uplink equalizer state among the plurality of uplink equalizer states associated with a smallest recorded uplink ripple among the plurality of recorded uplink ripples.

11. The system of claim 10, wherein the at least one uplink port is comprised of an uplink simplex port and a duplex port.

12. The system of claim 11, wherein:
the uplink simplex port is configured to receive the uplink communications signal from the uplink equalizer and provide the uplink communications signal to the signal source when the duplex port is decoupled from the signal source; and
the duplex port is configured to receive the uplink communications signal from the uplink equalizer and provide the uplink communications signal to the signal source when the uplink simplex port is decoupled from the signal source.

13. The system of claim 12, wherein the control system is configured to receive the uplink test signal at the uplink simplex port when the uplink simplex port is configured to provide the uplink communications signal to the signal source.

14. The system of claim 12, wherein the control system is configured to receive the uplink test signal at the duplex port when the duplex port is configured to provide the uplink communications signal to the signal source.

15. The system of claim 10, wherein:
the RIM controller is further configured to command the uplink equalizer to go through the plurality of uplink equalizer states based on the plurality of uplink digital words, respectively; and
the non-volatile memory is further configured to record the uplink ripple in association with the uplink equalizer state for each of the plurality of uplink equalizer states.

16. The system of claim 15, wherein:
the signal generator is further configured to generate the uplink test signal comprising the one or more predefined uplink frequency steps across the uplink frequency spectrum of the uplink communications signal;
the spectrum analyzer is further configured measure the uplink ripple of the at least one RIM for each of the plurality of uplink equalizer states; and
the controller is further configured to:
control the RIM controller to command the uplink equalizer to go through the plurality of uplink equalizer states based on the plurality of uplink digital words, respectively;
examine the plurality of recorded uplink ripples corresponding to the plurality of uplink equalizer states, respectively; and
define the predetermined uplink equalizer setting as the uplink equalizer state among the plurality of uplink equalizer states associated with the smallest recorded uplink ripple among the plurality of recorded uplink ripples.

17. The system of claim 10, wherein the uplink equalizer is a digitally controlled uplink equalizer.

18. The system of claim 10, wherein the at least one RIM is communicatively coupled to at least one optical interface module (OIM), the at least one OIM is configured to:
receive the downlink communications signal and convert the downlink communications signal into a downlink optical fiber-based communications signal for distribution to at least one remote antenna unit (RAU) in the DAS;
receive an uplink optical fiber-based communications signal from the at least one RAU; and
convert the uplink optical fiber-based communications signal into the uplink communications signal and provide the uplink communications signal to the at least one RIM.

19. A method for optimizing ripple reductions in a distributed antenna system (DAS), comprising:
communicatively coupling a control system to at least one radio interface module (RIM) configured to communicate a downlink communications signal in a downlink frequency spectrum;
commanding a downlink equalizer in the at least one RIM to go through a plurality of downlink equalizer states based on a plurality of downlink digital words, respectively;
for each downlink equalizer state of the plurality of downlink equalizer states:
providing a downlink test signal comprising one or more predefined downlink frequency steps across the downlink frequency spectrum of the downlink communications signal; and
measuring and recording a respective downlink ripple of the at least one RIM in association with each downlink equalizer state of the plurality of downlink equalizer states based on the downlink test signal;
examining a plurality of recorded downlink ripples corresponding to the plurality of downlink equalizer states, respectively;
defining a predetermined downlink equalizer setting as a downlink equalizer state among the plurality of downlink equalizer states associated with a smallest recorded downlink ripple among the plurality of recorded downlink ripples; and configuring the downlink equalizer to minimize downlink ripple of the at least one RIM based on the predetermined downlink equalizer setting.

20. The method of claim 19, further comprising providing the downlink test signal to a downlink simplex port in the at least one RIM when the downlink simplex port is configured to communicate the downlink communications signal.

21. The method of claim 19, further comprising providing the downlink test signal to a duplex port in the at least one RIM when the duplex port is configured to communicate the downlink communications signal.

22. The method of claim 19, further comprising receiving the downlink test signal at a downlink interface of the at least one RIM.

23. The method of claim 19, further comprising:

communicatively coupling the control system to the at least one RIM configured to communicate an uplink communications signal in an uplink frequency spectrum;

commanding an uplink equalizer in the at least one RIM to go through a plurality of uplink equalizer states based on a plurality of uplink digital words, respectively;

for each uplink equalizer state of the plurality of uplink equalizer states:

providing an uplink test signal comprising one or more predefined uplink frequency steps across the uplink frequency spectrum of the uplink communications signal; and measuring and recording a respective uplink ripple of the at least one RIM in association with each uplink equalizer state of the plurality of uplink equalizer states based on the uplink test signal;

examining a plurality of recorded uplink ripples corresponding to the plurality of uplink equalizer states, respectively;

defining a predetermined uplink equalizer setting as an uplink equalizer state among the plurality of uplink equalizer states associated with a smallest recorded uplink ripple among the plurality of recorded uplink ripples; and configuring the uplink equalizer to minimize uplink ripple of the at least one RIM based on the predetermined uplink equalizer setting.

24. The method of claim 23, further comprising receiving the uplink test signal at an uplink simplex port in the at least one RIM when the uplink simplex port is configured to communicate the uplink communications signal.

25. The method of claim 23, further comprising receiving the uplink test signal at a duplex port in the at least one RIM when the duplex port is configured to communicate the uplink communications signal.

* * * * *